US012553277B2

(12) United States Patent
Crenshaw

(10) Patent No.: US 12,553,277 B2
(45) Date of Patent: Feb. 17, 2026

(54) DOOR SYSTEM AND COMPONENTS THEREOF

(71) Applicant: LOVE THAT DOOR, LLC, Dallas, TX (US)

(72) Inventor: Timothy Chad Crenshaw, Dallas, TX (US)

(73) Assignee: Love That Door, LLC, Dallas, TX (US)

( * ) Notice: Subject to any disclaimer, the term of this patent is extended or adjusted under 35 U.S.C. 154(b) by 0 days.

(21) Appl. No.: 18/732,307

(22) Filed: Jun. 3, 2024

(65) Prior Publication Data

US 2024/0401395 A1 Dec. 5, 2024

Related U.S. Application Data

(60) Provisional application No. 63/622,061, filed on Jan. 17, 2024, provisional application No. 63/622,006, filed on Jan. 17, 2024, provisional application No. 63/511,676, filed on Jul. 2, 2023, provisional application No. 63/470,894, filed on Jun. 3, 2023.

(51) Int. Cl.

| | |
|---|---|
| ***E06B 3/36*** | (2006.01) |
| ***E06B 3/30*** | (2006.01) |
| ***E06B 3/70*** | (2006.01) |
| ***E06B 9/24*** | (2006.01) |
| *E06B 3/263* | (2006.01) |

(52) U.S. Cl.

CPC .............. *E06B 3/365* (2013.01); *E06B 3/307* (2013.01); *E06B 3/7001* (2013.01); *E06B 9/24* (2013.01); *E06B 2003/26349* (2013.01)

(58) Field of Classification Search

CPC .......... E06B 3/362; E06B 3/365; E06B 7/231; E06B 2003/346

USPC .......................................................... 49/478.1

See application file for complete search history.

(56) References Cited

U.S. PATENT DOCUMENTS

| | | | | |
|---|---|---|---|---|
| 3,432,966 A | | 3/1969 | Bordner | |
| 3,729,869 A | * | 5/1973 | Wenig | E06B 3/16 52/843 |
| 5,129,184 A | * | 7/1992 | Fish | F25D 23/087 49/478.1 |
| 5,216,840 A | | 6/1993 | Andrews | |
| 6,006,489 A | | 12/1999 | Zadok | |

(Continued)

FOREIGN PATENT DOCUMENTS

CA 2483889 A1 4/2006

OTHER PUBLICATIONS

Office Action, dated Feb. 6, 2025, by the USPTO, U.S. Appl. No. 18/895,202.

(Continued)

*Primary Examiner* — Daniel J Troy
*Assistant Examiner* — Susan M. Heschel
(74) *Attorney, Agent, or Firm* — Law Office of Bill Naifeh

(57) ABSTRACT

There is disclosed certain embodiments of a double door system comprising a first door having a first interior mullion with a first astragal formed on an interior face of the first interior mullion; and a second door having a second interior mullion with a second astragal formed on an exterior face of the second interior mullion. Other improvements may include the use of magnetic weather stripping which can be formed to fit curve doors and the use of removable decorative panels.

12 Claims, 33 Drawing Sheets

(56) References Cited

U.S. PATENT DOCUMENTS

| | | | | |
|---|---|---|---|---|
| 8,484,916 | B2 * | 7/2013 | Farag | B32B 17/10366 52/204.5 |
| 8,793,932 | B1 * | 8/2014 | Lindgren | E06B 3/685 49/63 |
| 8,839,564 | B2 | 9/2014 | Happel et al. | |
| 8,998,354 | B2 * | 4/2015 | Wach | A47F 3/0434 312/138.1 |
| 9,175,508 | B1 * | 11/2015 | Steele | E06B 3/72 |
| 10,458,177 | B1 * | 10/2019 | Steele | E06B 3/5892 |
| 2004/0119298 | A1 * | 6/2004 | Massey | E06B 3/365 292/300 |
| 2005/0120631 | A1 | 6/2005 | Sanders | |
| 2005/0193784 | A1 | 9/2005 | Sanders | |
| 2008/0295425 | A1 | 12/2008 | Farag | |
| 2022/0090846 | A1 * | 3/2022 | Smajser | E06B 3/66333 |

OTHER PUBLICATIONS

Office Action-Restriction, dated Nov. 18, 2024, by the USPTO, U.S. Appl. No. 18/895,202.

Final Office Action, dated May 15, 2025, 2025, by the USPTO, U.S. Appl. No. 18/895,202.

* cited by examiner

DOOR SYSTEM AND COMPONENTS THEREOF

CLAIM OF PRIORITY

This application claims the benefit of U.S. Provisional Application 63/470,894, filed on Jun. 3, 2023, and entitled "AN IMPROVED DOUBLE DOOR SYSTEM"; U.S. Provisional Application 63/511,676, filed on Jul. 2, 2023, and entitled "MAGNETIC WEATHER STRIPPING"; U.S. Provisional Application 63/622,006, filed on Jan. 17, 2024, and entitled "MAGNETIC WEATHER STRIPPING"; and U.S. Provisional Application 63/622,061, filed on Jan. 17, 2024, and entitled "INTERCHANGEABLE DECORATIVE DOOR PANEL SYSTEM", all of which are incorporated by reference herein in their entirety.

TECHNICAL FIELD

The invention relates in general to exterior doors, and in particular to double door systems having one or more such improvements as improved weather seals, improved astragals, removeable screens, and hinged window sections.

BACKGROUND SECTION

Decorative and majestic double door systems are common in larger homes. However, such doors may not be energy efficient. In the face of rising energy costs, there is a need for energy efficient double door systems.

DETAILED DESCRIPTION

Figure 1:
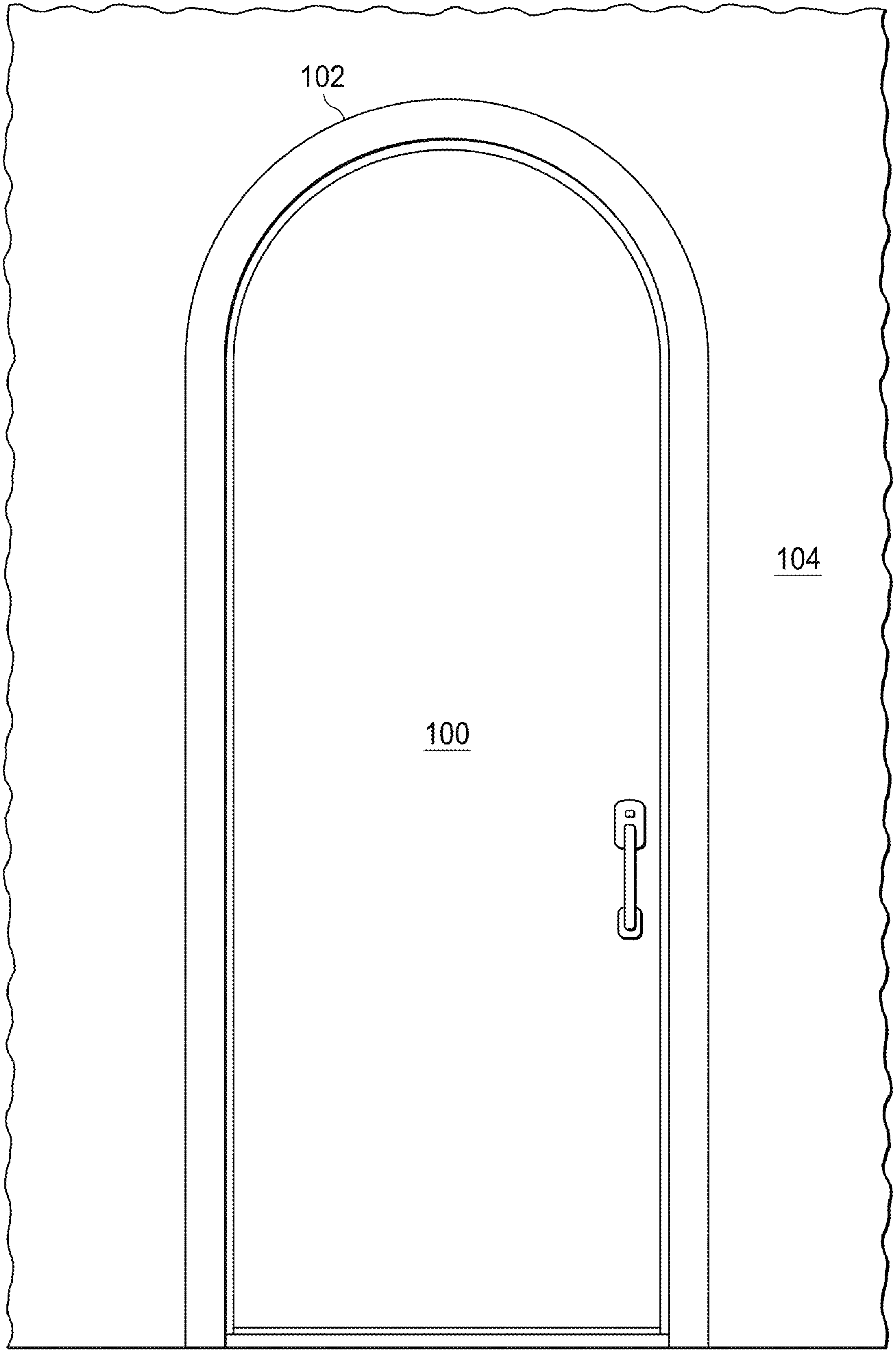
FIG. 1 illustrates an embodiment of a front or exterior view of an exterior door.

For the purposes of promoting an understanding of the principles of the present inventions, reference will now be made to the embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the inventions as described herein are contemplated as would normally occur to one skilled in the art to which the invention relates.

When directions, such as upper, lower, top, bottom, clockwise, counter-clockwise, are discussed in this disclosure, such directions are meant to only supply reference directions for the illustrated figures and for orientation of components in the figures. The directions should not be read to imply actual directions used in any resulting invention or actual use. Under no circumstances should such directions be read to limit or impart any meaning into the claims.

Referring to FIG. 1, one embodiment of a conventional door 100 is illustrated. The door 100, which may be of many different shapes and sizes, is generally coupled to a door frame 102 that is set into a wall or similar structure 104.

Figure 2A:
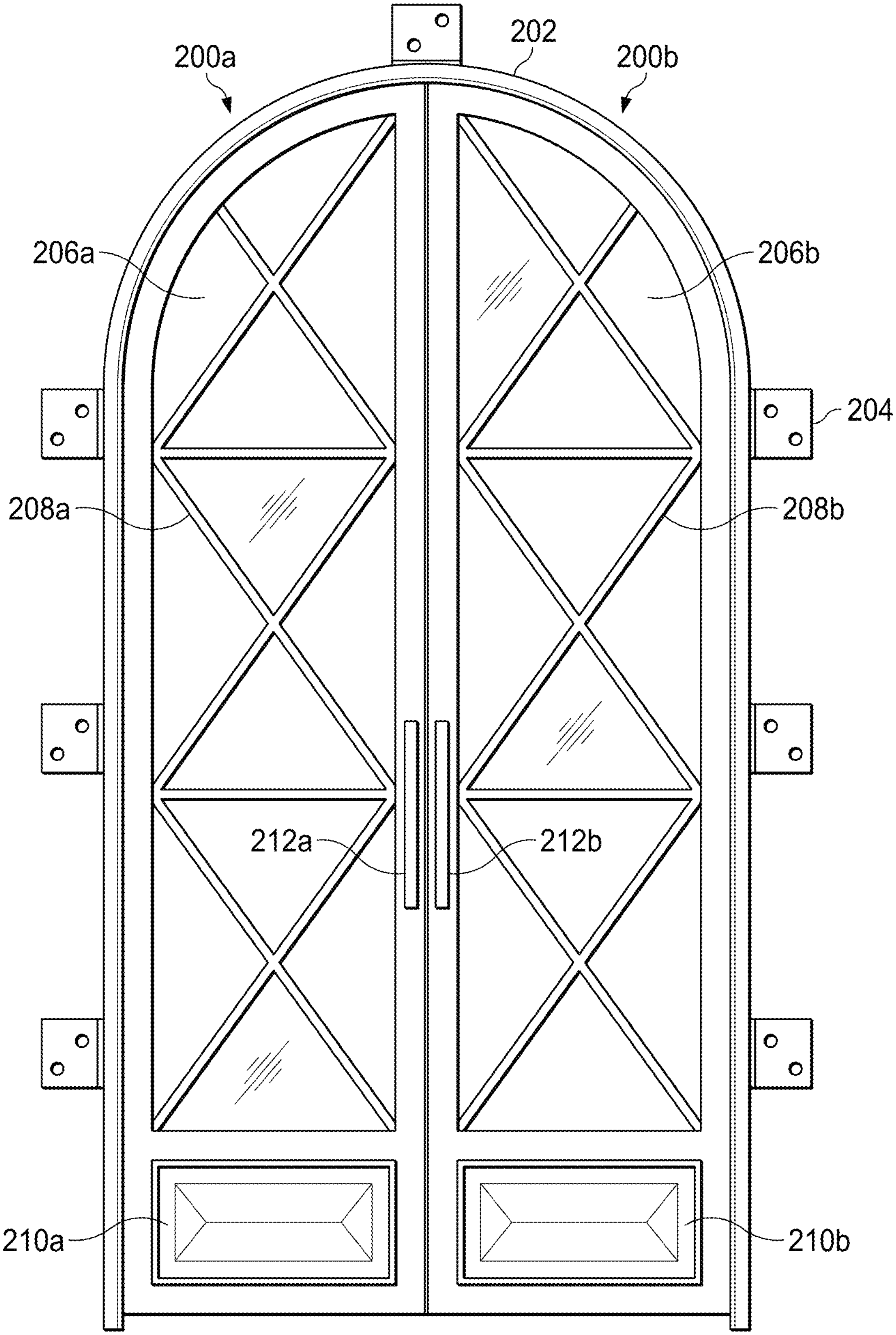
FIGS. 2A and 2B illustrate an embodiment of a front or exterior view (FIG. 2A) and a rear or interior view (FIG. 2B) of an exterior double door.
Figure 2B:
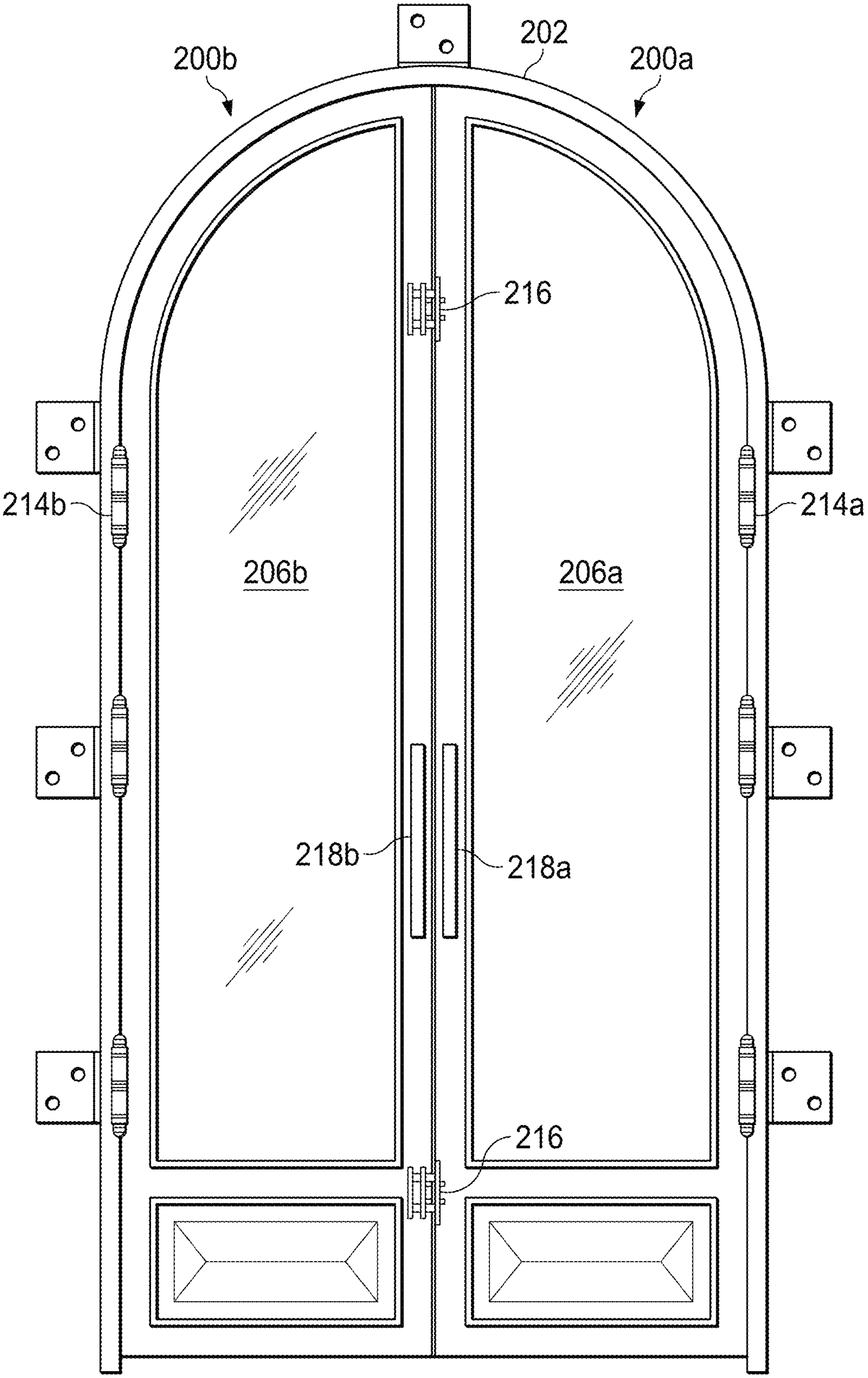

Referring to FIGS. 2A and 2B, an embodiment of a double door system is illustrated with an exterior view (FIG. 2A) and an interior view (FIG. 2B) showing doors 200*a* and 200*b*. One or both doors 200*a* and 200*b* may be coupled to a door frame 202 via hinges and/or other mechanisms that allow movement of the doors 200*a* and 200*b* relative to the door frame 202. The door frame 202 may be coupled to a wall or other structure using fasteners (e.g., screws or bolts) and/or fastening plates 204, which may be external to the wall or internal so that the fasteners and/or fastening plates 204 are not readily viewable.

The doors 200*a* and 200*b* may each include one or more glass panels 206*a* and 206*b*, respectively. Decorative and/or security panels 208*a* and 208*b* may be positioned on the outside of the doors (e.g., in front of the glass panels 206*a* and 206*b* when viewed externally as in FIG. 2A). The doors 200*a* and 200*b* may also include decorative panels 210*a* and 210*b*, respectively, that are not integrated with the glass panels 206*a* and 206*b*. Although not shown, it is understood that mullions and/or other features may also be present on or between one or both of the doors 200*a* and 200*b*. Handles 212*a* and 212*b* may be used to open the doors 200*a* and 200*b*, respectively, from the outside.

Referring specifically to FIG. 2B, hinges 214*a* and 214*b* may couple their respective doors 200*a* and 200*b* to the door frame 202. One or more locking mechanisms 216 may be used to secure the doors to one another to prevent them from being opened. Handles 218*a* and 218*b* may be used to open the doors 200*a* and 200*b*, respectively, from the inside. In the present example, the glass panels 206*a* and 206*b* are shown as a single window in their respective door 200*a* and 200*b*, but it is understood that one or both of the glass panels may be divided into multiple panels.

Figure 3A:
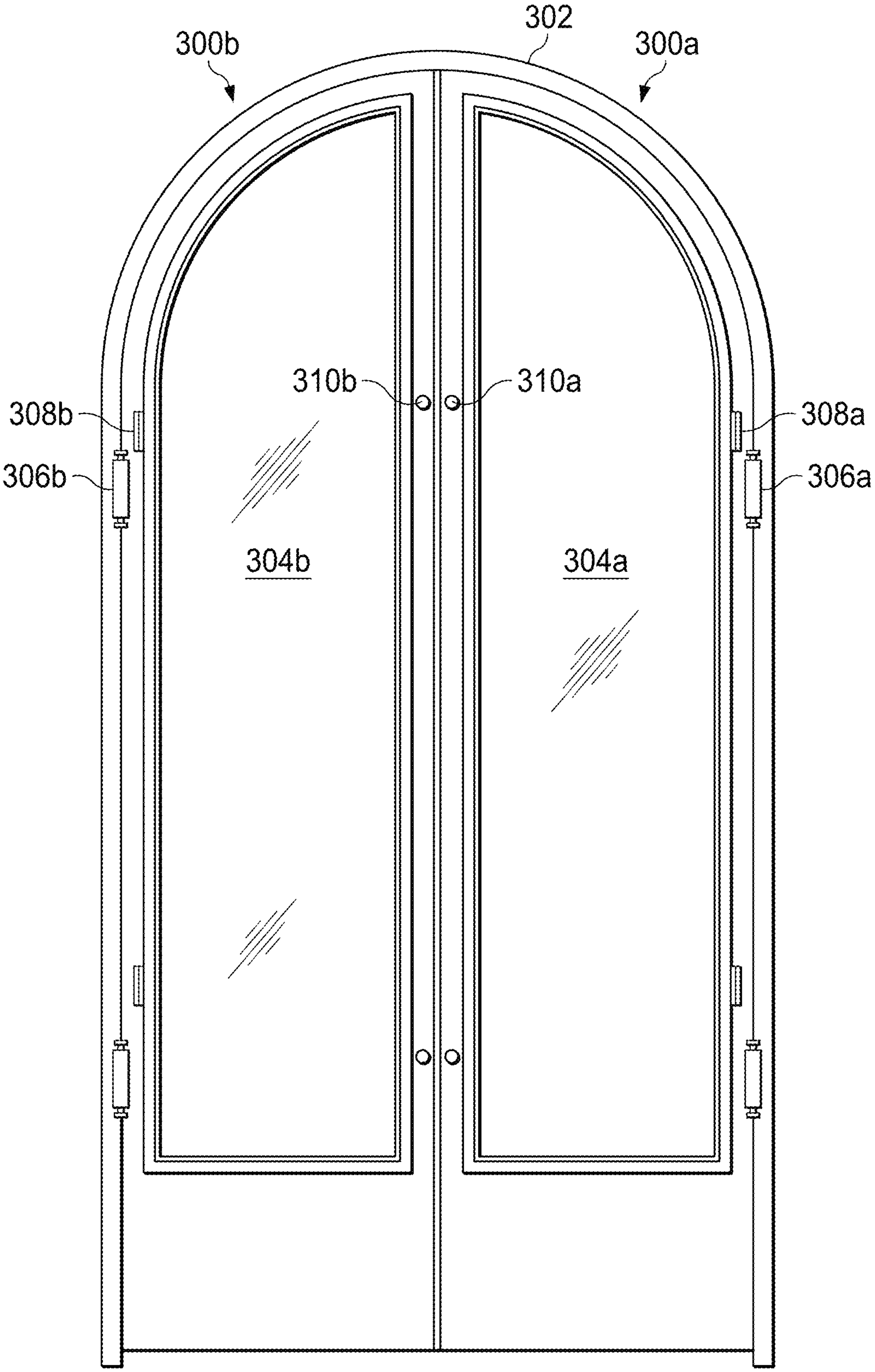
FIGS. 3A and 3B illustrate an embodiment of interior views of an exterior double door with hinged glass panels that are closed (FIG. 3A) and with one hinged glass panel open and the other closed (FIG. 3B).
Figure 3B:
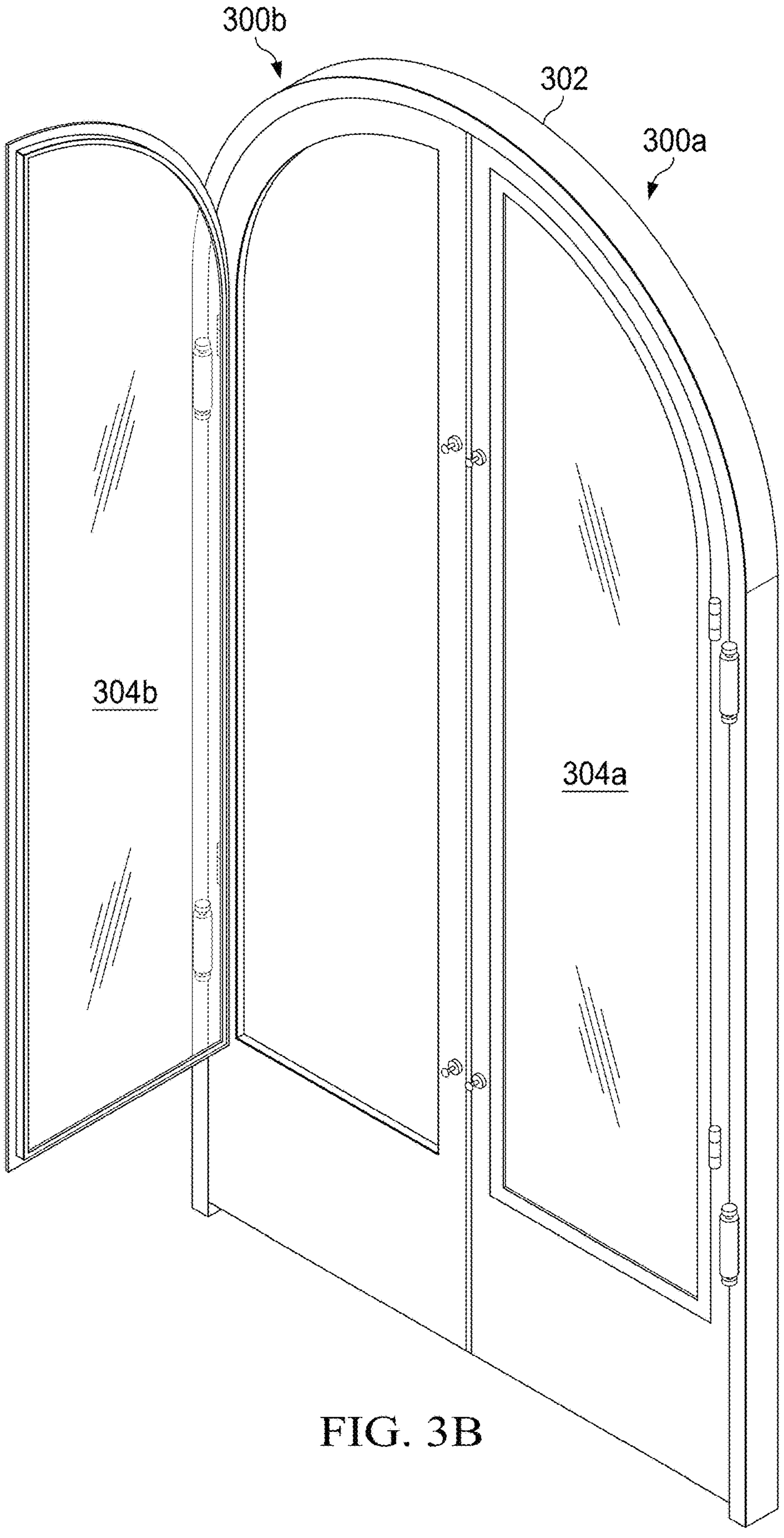

Referring to FIGS. 3A and 3B, an embodiment of a double door system is illustrated with interior views of doors 300*a* and 300*b* coupled to a door frame 302. The doors 300*a* and 300*b* may each include one or more glass panels 304*a* and 304*b*, respectively. Hinges 306*a* and 306*b* may couple their respective doors 300*a* and 300*b* to the door frame 302. Hinges 308*a* and 308*b* may couple the glass panels 304*a* and 304*b*, respectively, to their respective doors 300*a* and 300*b*, and enable the glass panel to be opened while the door remains closed (FIG. 3B). Locking mechanisms 310*a* and 310*b* may be used to secure the glass panels 304*a* and 304*b*, respectively, to their respective doors 300*a* and 300*b*.

Figure 3C:
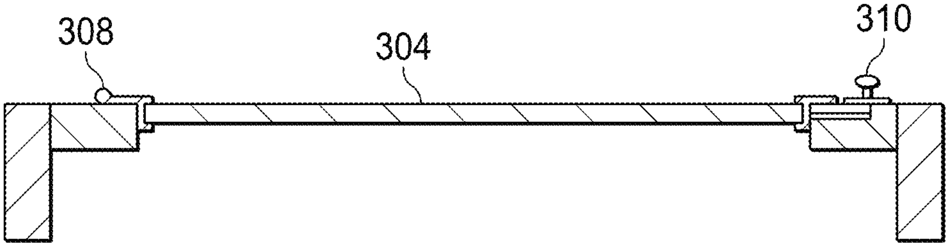
FIG. 3C is a horizontal section view of the door of FIG. 3A showing details of one of the glass panels in a first or closed configuration.
Figure 3D:
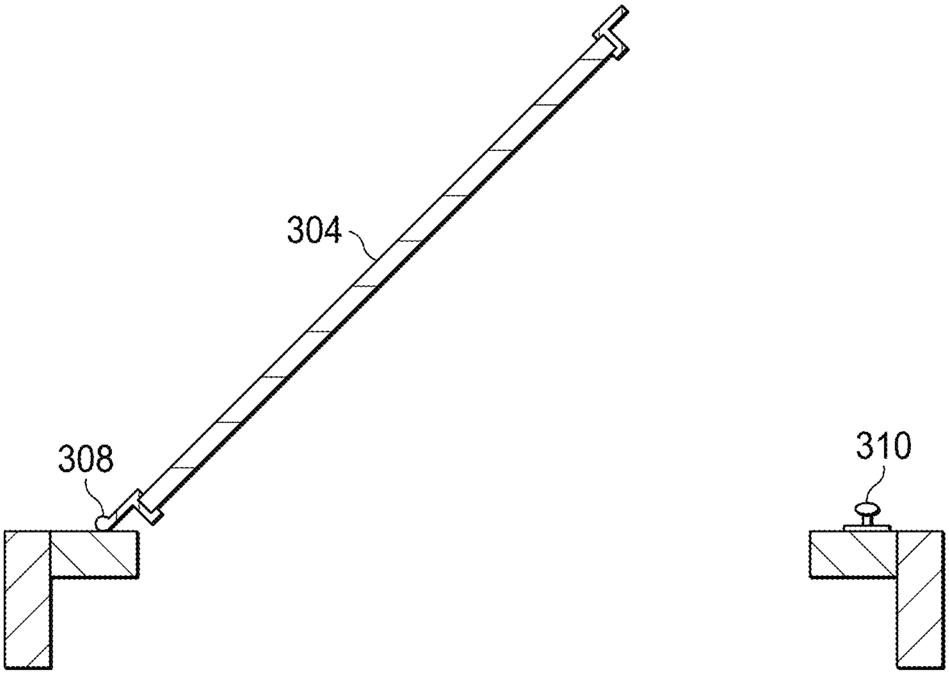
FIG. 3D is a horizontal section view of the door of FIG. 3A showing details of the glass panel in a second or open configuration.

Referring to FIGS. 3C and 3D, an embodiment of a horizontal cross section of a door 300 (e.g., one of the doors 300*a* and 300*b* of FIGS. 3A and 3B) is illustrated. FIG. 3C illustrates a glass panel 304 coupled to the hinge 308 of the door 300 in a closed position and secured by locking mechanism 310, while FIG. 3D illustrates the glass panel 304 in an open position.

Figure 4A:
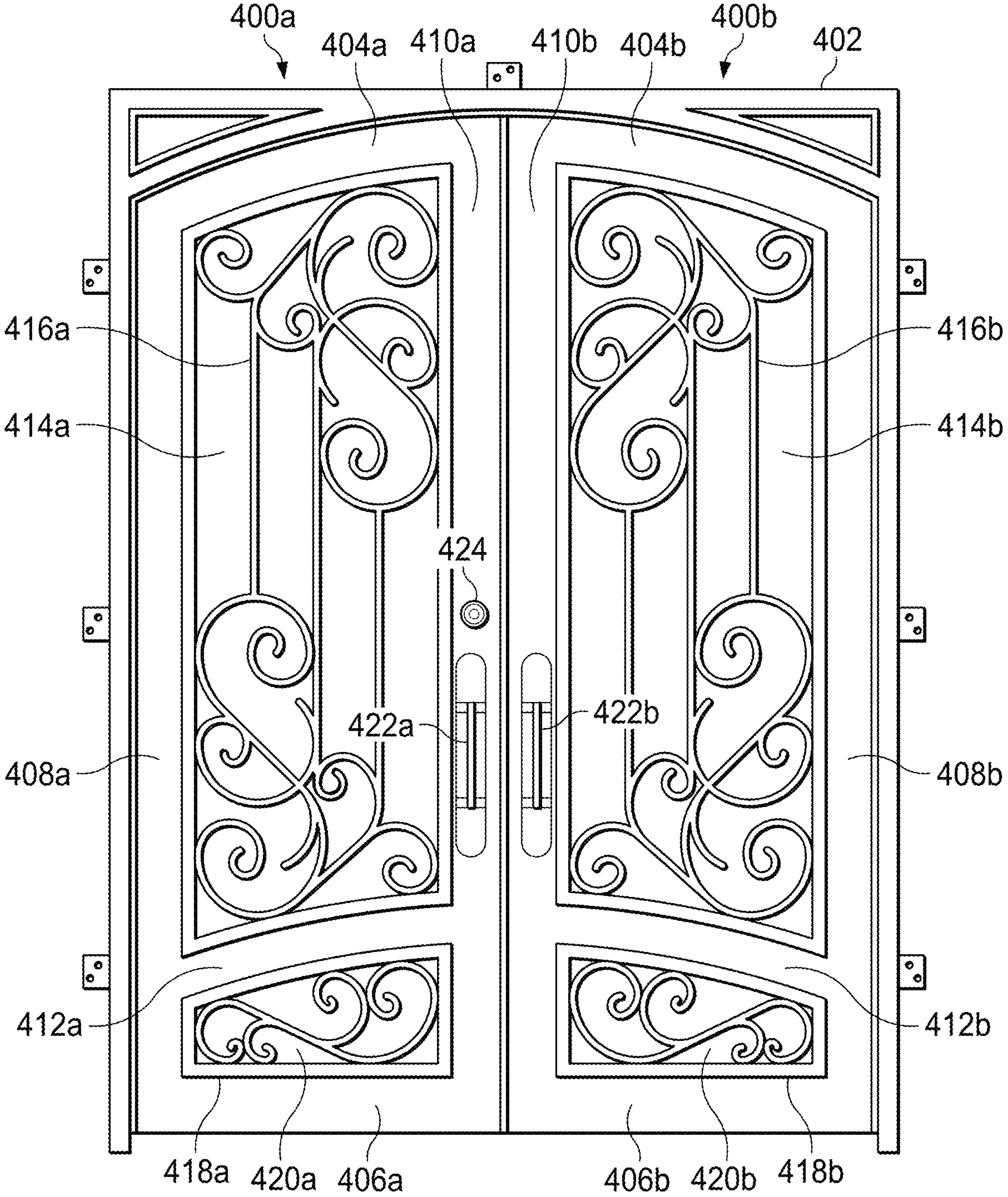
FIGS. 4A and 4B illustrate one embodiment of exterior views of an improved double door system.
Figure 4B:
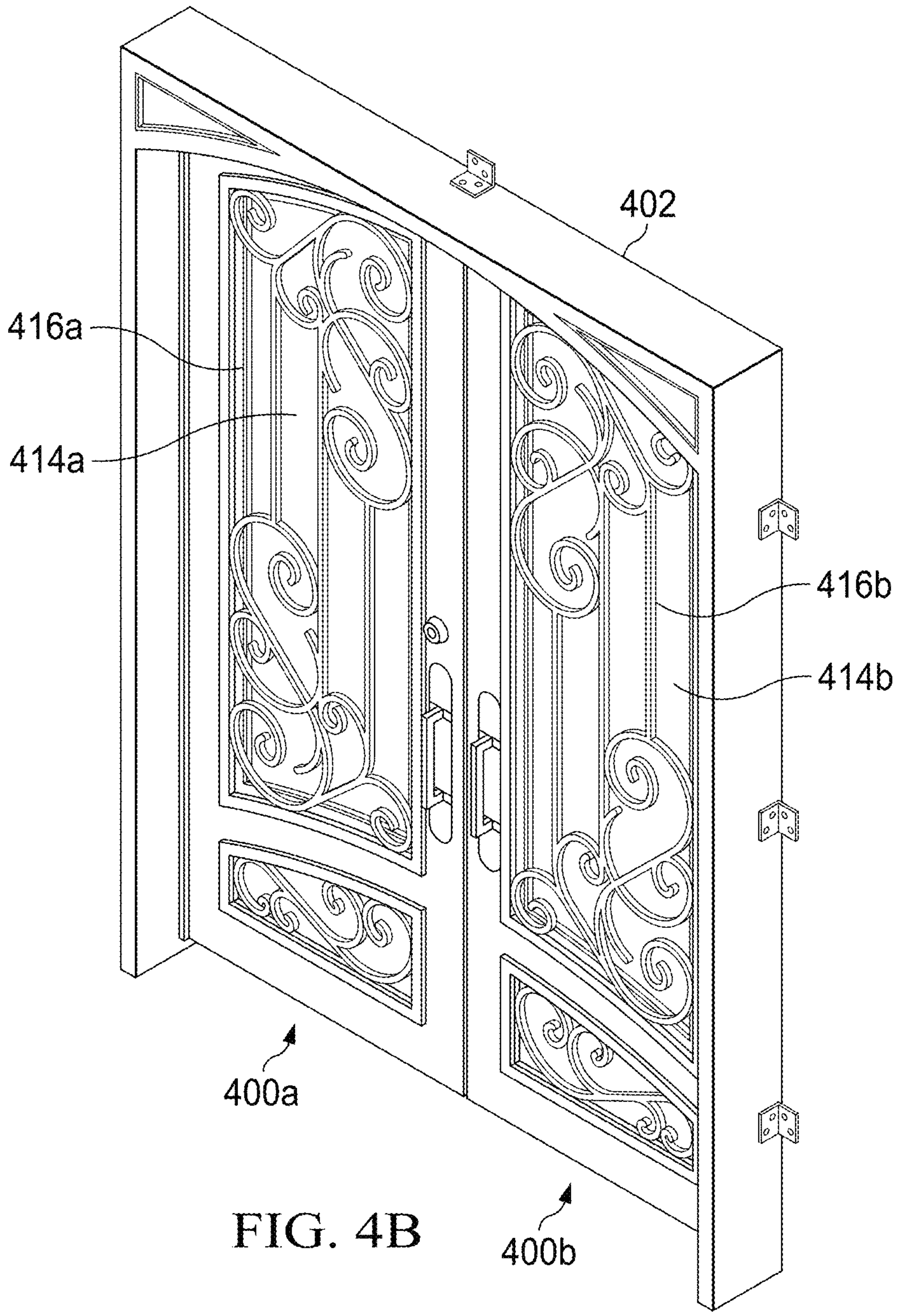
Figure 4C:
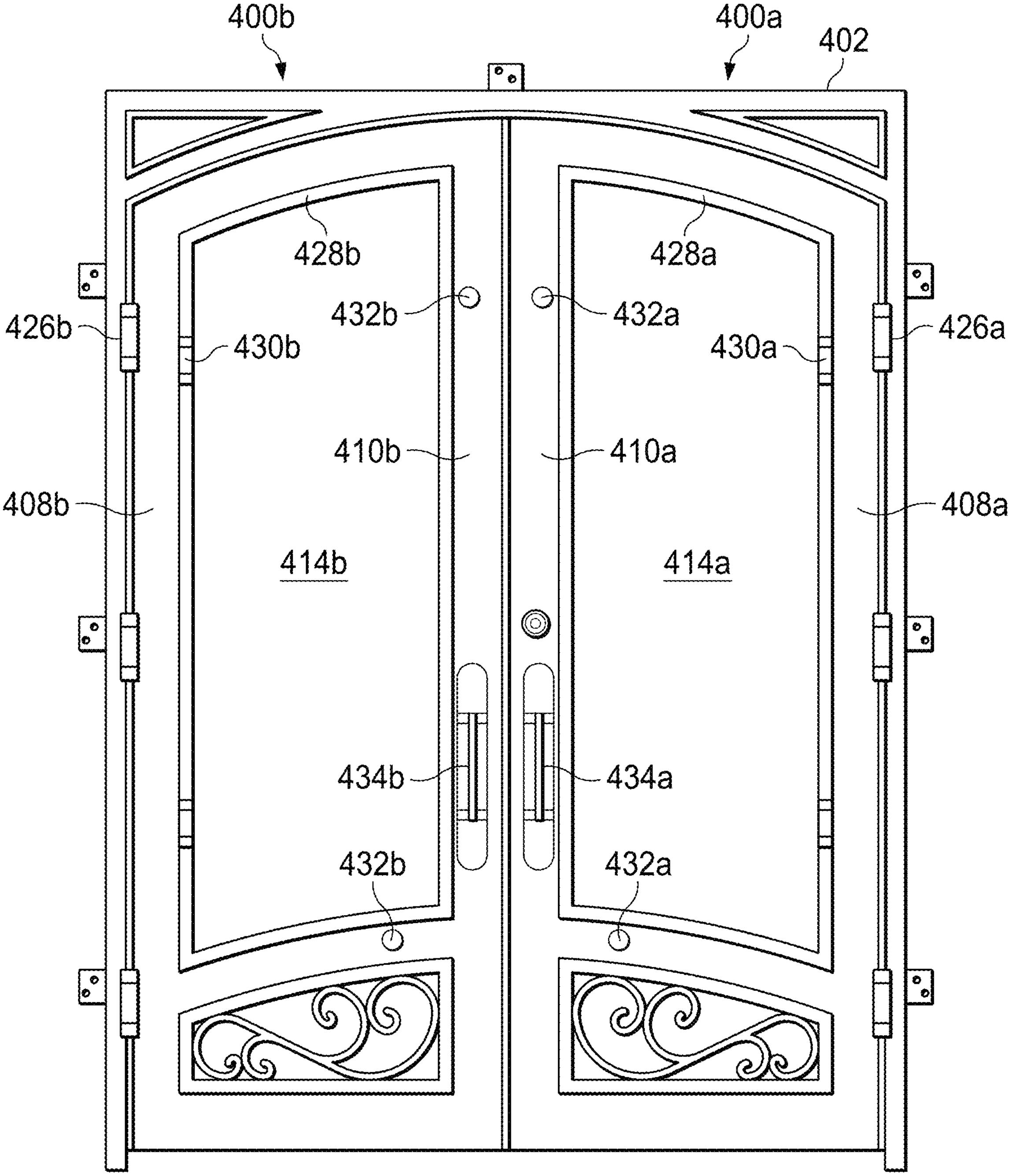
FIGS. 4C and 4D illustrate one embodiment of interior views of the improved double door system of FIGS. 4A and 4B.
Figure 4D:
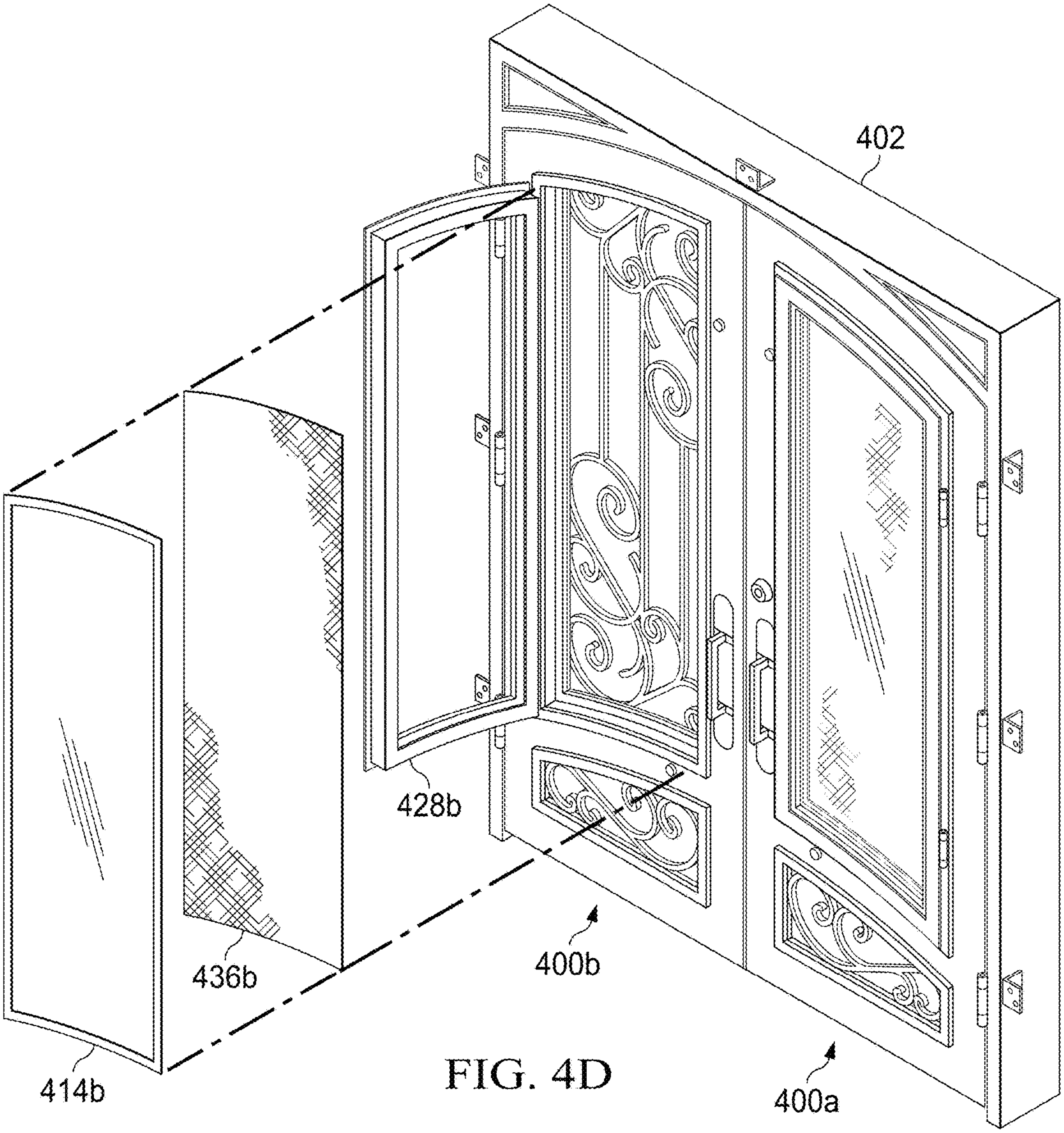

Referring to FIGS. 4A-4D, one embodiment of a double door system is illustrated with doors 400*a* and 400*b* that are coupled to a door frame 402 in a manner that enables movement of the doors relative to the door frame. FIGS. 4A and 4B illustrate an exterior view of the doors 400*a* and 400*b*, and FIGS. 4C and 4D illustrate an interior view of the doors. It is understood that the frame 402 may be coupled to a structure, but the structure is not shown.

Referring specifically to FIGS. 4A and 4B, the door 400*a* may include a top rail 404*a* and a bottom rail 406*a* that are coupled by a hinge stile 408*a* and a latch or lock stile 410*a*. In the present example, one or more cross or mid rails 412*a* may be present. A glass panel 414*a* positioned between the top rail 404*a* and the mid rail 412*a* may be partially covered by a decorative panel 416*a*. Another decorative panel 418*a* may be positioned between the mid rail 412*a* and the bottom rail 406*a*, and a glass panel 420*a* may be positioned behind, or integrated with, the decorative panel 418*a* in some examples.

An exterior handle 422*a* may be provided to open and/or close the door 400*a*. A lock 424 may be provided to lock the doors 400*a* and 400*b* and prevent them from being opened. In some embodiments, a mullion (not shown) may be present between the doors 400*a* and 400*b*, and one or both of the doors may lock by engaging the mullion.

Similarly, the door 400*b* may include a top rail 404*b* and a bottom rail 406*b* that are coupled by a hinge stile 408*b* and a latch or lock stile 410*b*. In the present example, one or more cross or mid rails 412*b* may be present. A glass panel 414*b* positioned between the top rail 404*b* and the mid rail 412*b* may be partially covered by a decorative panel 416*b*. Another decorative panel 418*b* may be positioned between the mid rail 412*b* and the bottom rail 406*b*, and a glass panel 420*b* may be positioned behind, or integrated with, the decorative panel 418*b* in some examples. An exterior handle 422*b* may be provided to open and/or close the door 400*b*.

Although shown as inset from the door frame 402 in FIG. 4B, it is understood that the doors 400*a* and 400*b* may be flush with the frame. Furthermore, in other embodiments, one or both of the doors 400*a* and 400*b* may have different shapes, different numbers of glass panels and/or decorative panels, and/or the glass panels and/or decorative panels may have different shapes or designs. In addition, different types and numbers of hinges, handles, and/or locking mechanisms may be used and/or positioned differently from those shown. Some features and components described herein, such as the flexible weather seal, may be used with single doors, windows, and/or in other environments, and are not limited to double door systems. Accordingly, it is understood that the embodiments of FIGS. 4A-4D are intended to provide examples of various features and components, and are not intended to be limiting.

Referring specifically to FIGS. 4C and 4D, the interior view of the doors 400*a* and 400*b* is illustrated. The hinge stile 408*a* of the door 400*a* is coupled to the door frame 402 by hinges 426*a*. The glass panel 414*a* is set into a glass panel frame 428*a* that is moveably coupled to the hinge stile 408*a* by hinges 430*a*. It is understood that the glass panel frame 428*a* may be coupled to the door 400*a* in many different ways using many different fastening mechanisms, and the use of hinges 430*a* coupled to the hinge stile 408*a* is only one possible example. One or more fastening mechanisms 432*a* (e.g., bolts or latches) may be used to secure the glass panel frame 428*a* to the door 400*a*. An interior handle 434*a* may be provided to open and/or close the door 400*a*. Similarly, an interior handle 434*b* may be provided to open and/or close the door 400*b*.

The hinge stile 408*b* of the door 400*b* is coupled to the door frame 402 by hinges 426*b*. The glass panel 414*b* is set into a glass panel frame 428*b* that is moveably coupled to the hinge stile 408*b* by hinges 430*b*. One or more fastening mechanisms 432*b* (e.g., bolts or latches) may be used to secure the glass panel frame 428*b* to the door 400*b*.

As shown in FIG. 4D, a screen 436*b* may be positioned between the glass panel 414*b* and the decorative panel 428*b*. In some examples, the screen 436*b* may be removable, thereby enabling the screen to be removed or installed as desired by opening the glass panel frame 428*b* for access to the screen 436*b*. The screen 436*b* may be held in place by one or more fastening mechanisms, such as screws, bolts, latches, and/or magnets. As it may be desirable for the screen 436*b* to remain in place when the glass panel 414*b* is opened, such fastening mechanisms may be selected for both ease in installing and removing the screen, as well as their ability to secure the screen once it is in place. Although not shown, a similar or identical screen 436*a* may be present in the door 400*a*.

Figures 5A, 5B:
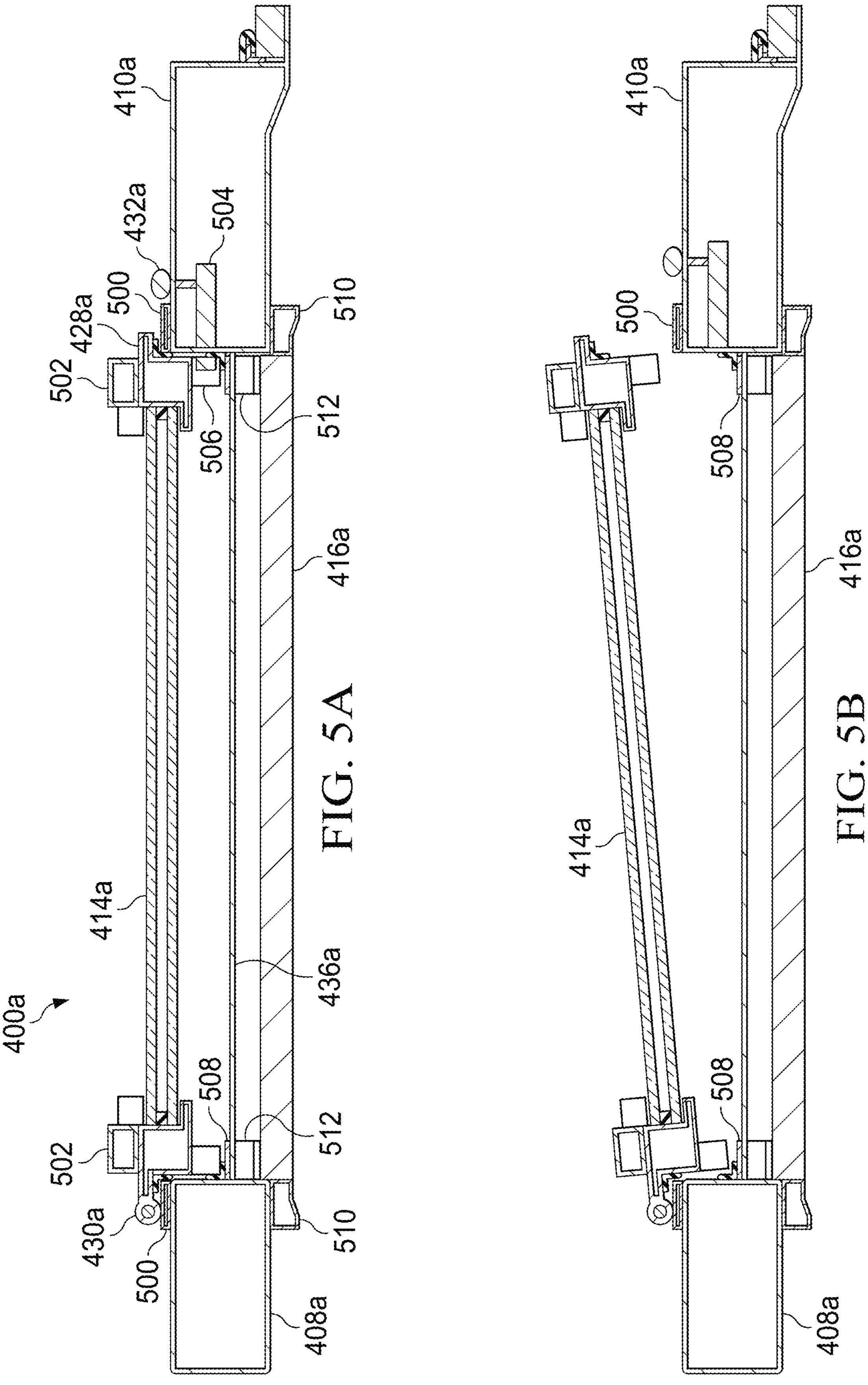
FIGS. 5A and 5B illustrate an embodiment of a horizontal section view of a door of FIGS. 4A-4D with the door's glass panel closed (FIG. 5A) and open (FIG. 5B).

Referring to FIGS. 5A and 5B, a section view of one embodiment of the door 400*a* of FIGS. 4A-4D is illustrated with the window closed (FIG. 5A) and partially open (FIG. 5B). When closed, the edges of the glass panel frame 428*a* may abut one or more weather strips 500 that may be designed to minimize the passage of air between the glass panel frame 428*a* and the top rail 404*a*, bottom rail 406*a*, hinge stile 408*a*, and latch stile 410*a*. The weather strip 500 may be a flexible weather seal in some embodiments, as will be described later in greater detail. The glass panel frame 428*a* may also include one or more fastening mechanisms 502 to secure the glass panel 414*a* (which may be a double paned window as shown or a single paned window) to the glass panel frame 428*a*, enabling the replacement of the glass panel.

The fastening mechanism 432*a* in the present example may use a bolt 504 to slideably engage a cavity provided by a retention mechanism 506 in the glass panel frame 428*a*. The screen 436*a* may be coupled to the glass panel frame 428*a* using one or more fastening mechanisms 508 (e.g., brackets, screws, bolts, and/or magnets). The decorative panel 416*a* may include, abut, or be coupled to a panel frame 510 and may rest against one or more stops 512.

In some embodiments, the glass panels may use ¾' or 1" glass to provide for better insulation of the door system. Furthermore, when magnetic weather stripping (as described below) is used, the need for compression locks may be reduced or eliminated. The window formed by the glass panels may be locked into a closed position with mini-dead bolts as illustrated. In certain embodiments, a locking system may include a primary dead bolt that locks the door and two relatively small "mini" dead bolts that lock the glass panels.

It is understood that, in other embodiments, the doors 400*a* and 400*b* may have different shapes, different numbers of glass panels and/or decorative panels, and/or the glass panels and/or decorative panels may have different shapes or designs (for the decorative panels). In addition, different types and numbers of hinges, handles, and/or locking mechanisms may be used and/or positioned differently from those shown. Accordingly, it is understood that the embodiment of FIGS. 5A and 5B is intended to provide examples of various features and components, and is not intended to be limiting.

Figure 6A:
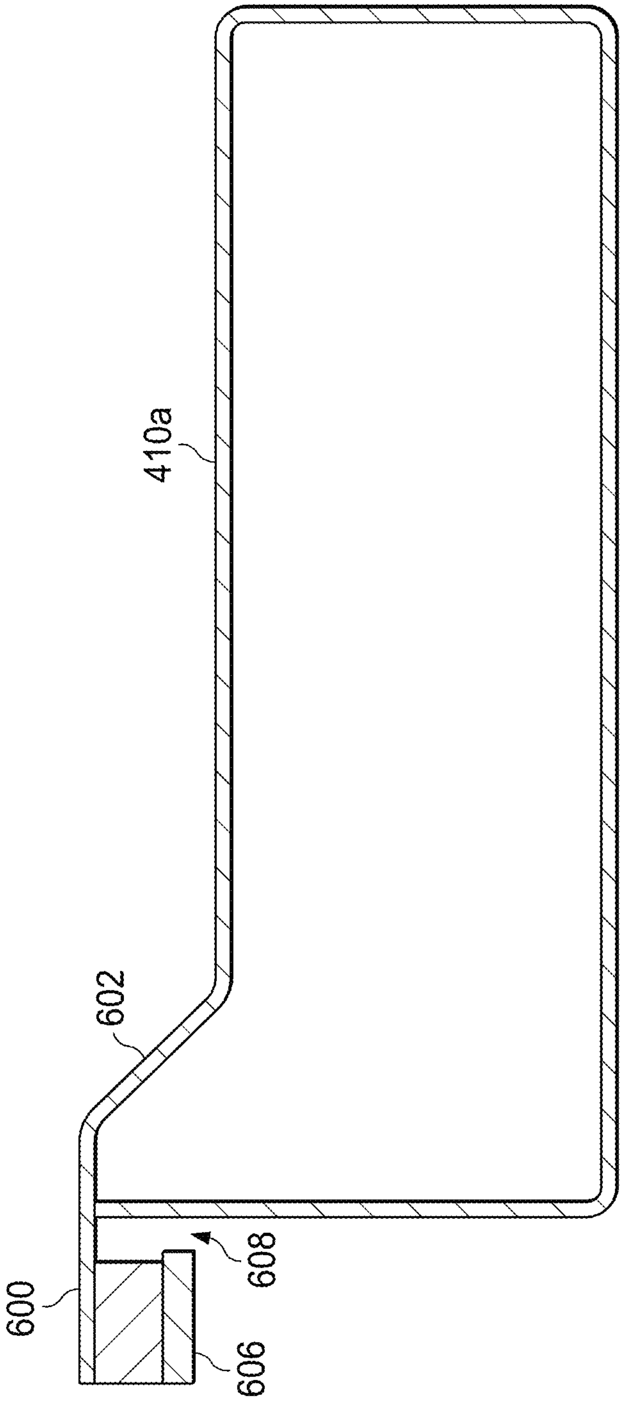
FIGS. 6A-6C illustrate embodiments of a portion of a door with an astragal.
Figure 6B:
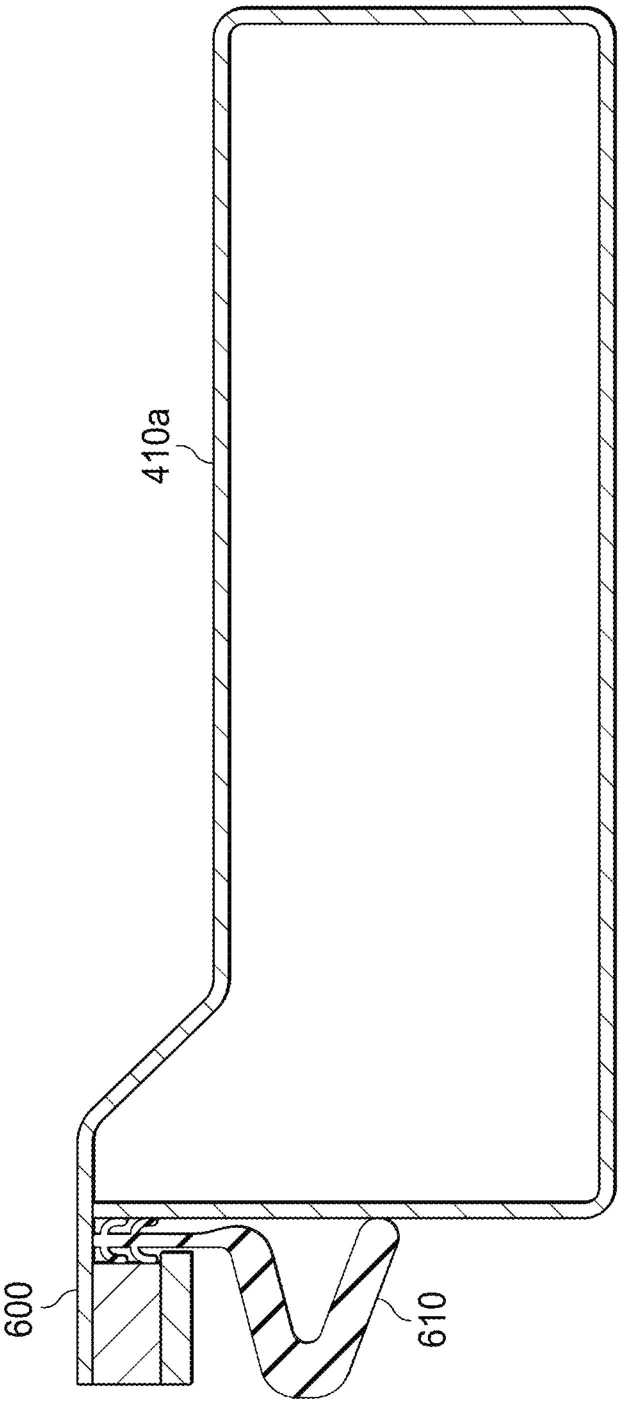
Figure 6C:
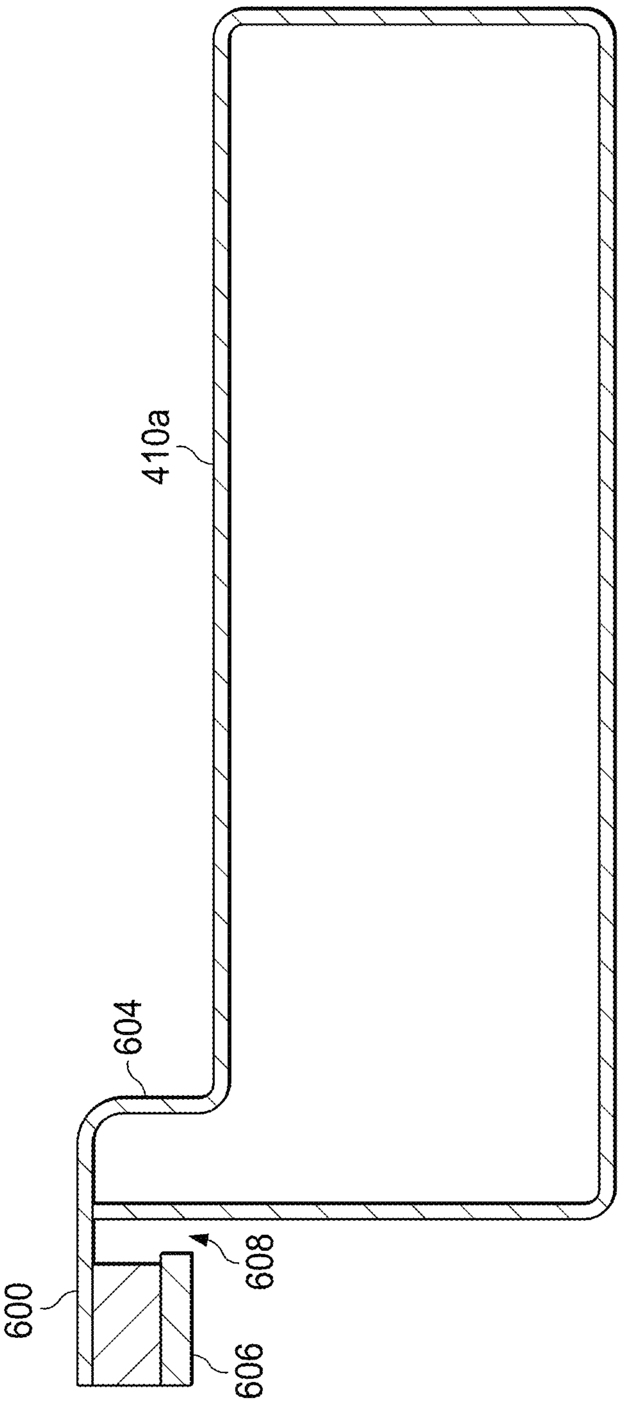

Referring to FIGS. 6A-6C, one embodiment of an astragal 600 is illustrated as being formed as part of, or coupled to, a portion of a door, such the latch stile 410*a* of the door 400*a* of FIG. 5A. In the present example, the astragal 600 is a protrusion that extends along some or all of the latch stile 410*a* to partially or completely cover any gap between the doors 400*a* and 400*b*.

In some embodiments, an astragal may be formed by a flat sheet or "over hanging" sheet of metal forming one side of the door's latch stile (or another vertical tube or mullion) as illustrated, for example, in FIGS. 6A-6C. Using an over hanging side eliminates the need for welding the astragal to the door and may make the astragal stronger and less prone to break or bend.

Accordingly, in FIG. 6A, the astragal 600 is formed using a surface 602 that is sloped relative to the flatter interior surface of the latch stile 410*a*, while the astragal 600 in FIG. 6C is formed using a surface 604 that is substantially perpendicular relative to the flatter interior surface of the latch stile. It is understood that many different configurations of an astragal may be used, and such configurations may use different orientations of adjoining surfaces relative to the interior or exterior surface of a door. Generally, an abutting surface 606 of the astragal 600 may be positioned so as to allow both doors to operate normally and then seal any gap once both doors are closed.

As shown in FIGS. 6A and 6C, the astragal 600 may be shaped to be coupled to and/or otherwise accommodate various forms of weather stripping. Accordingly, the astragal 600 may include one or more slots, grooves, and/or other cavities 608 to enable the coupling of a flexible weather seal 610 (FIG. 6B) to the door 400*a*. It is understood that many different attachment mechanisms may be used, and the door 400*a* may be configured in many different ways to provide for the use of such attachment mechanisms. The flexible weather seal 610 may be compressed to form a layer between the abutting surface 606 and the door 400*b* (or a mullion in other embodiments) when the door is closed. In some embodiments, the flexible weather seal 610 may be used to provide the weather seal 500 of FIGS. 5A and 5B.

Figure 7:
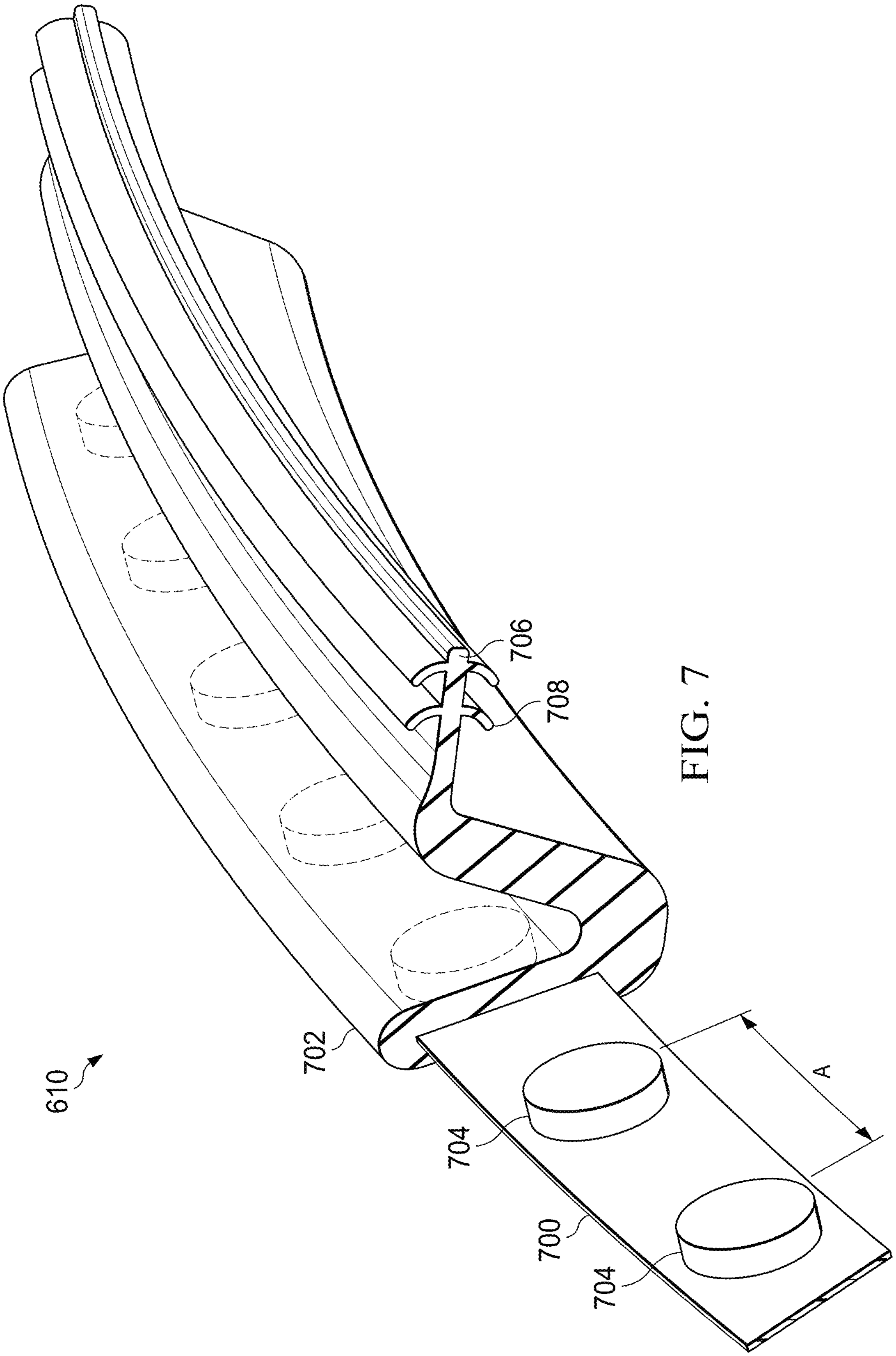
FIG. 7 illustrates one embodiment of a flexible weather seal.
Figure 8A:
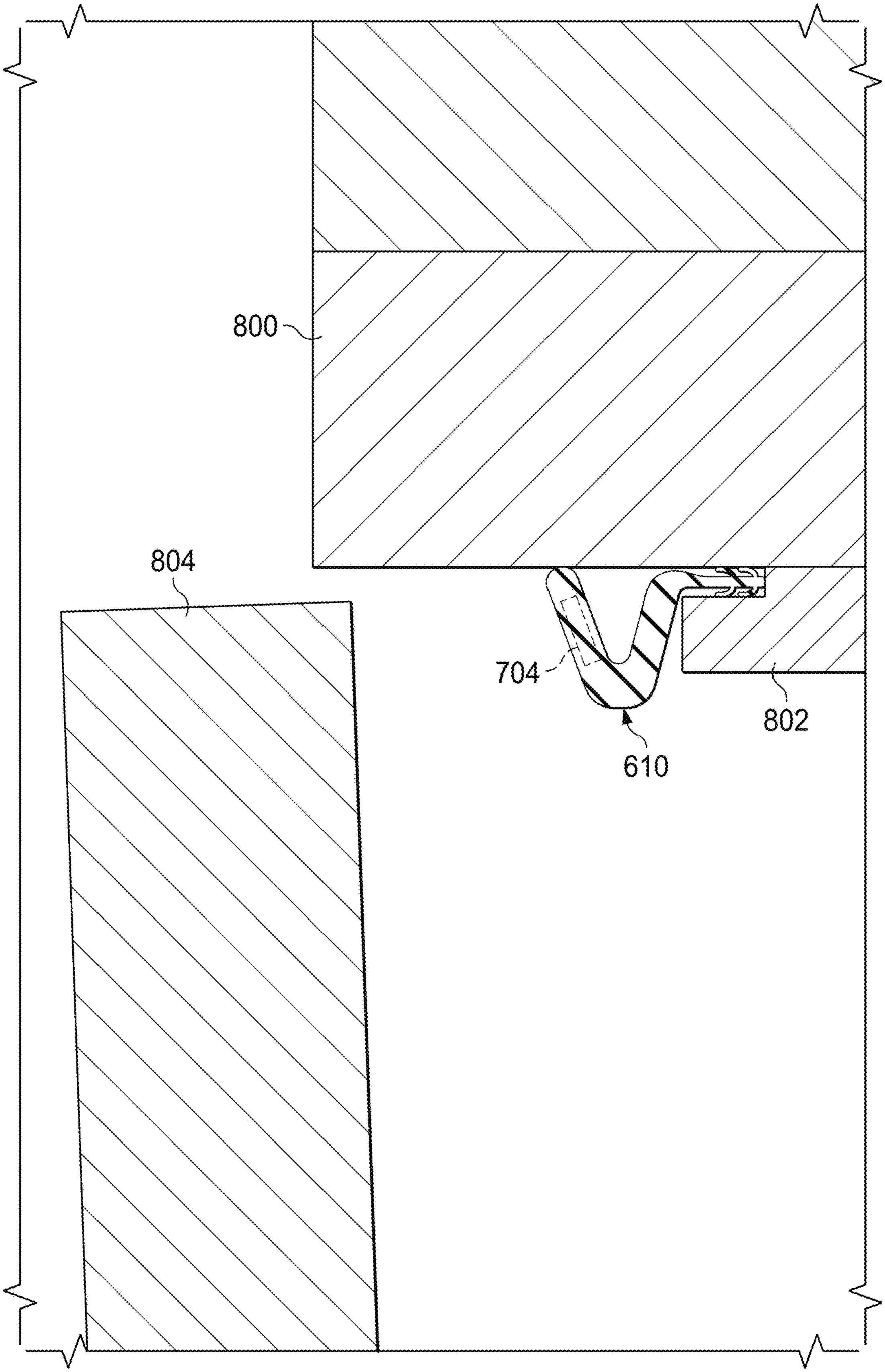
FIGS. 8A and 8B illustrate one embodiment of a section of a door and a door frame with the flexible weather seal of FIG. 7 where the door is open (FIG. 8A) and closed (FIG. 8B).
Figure 8B:
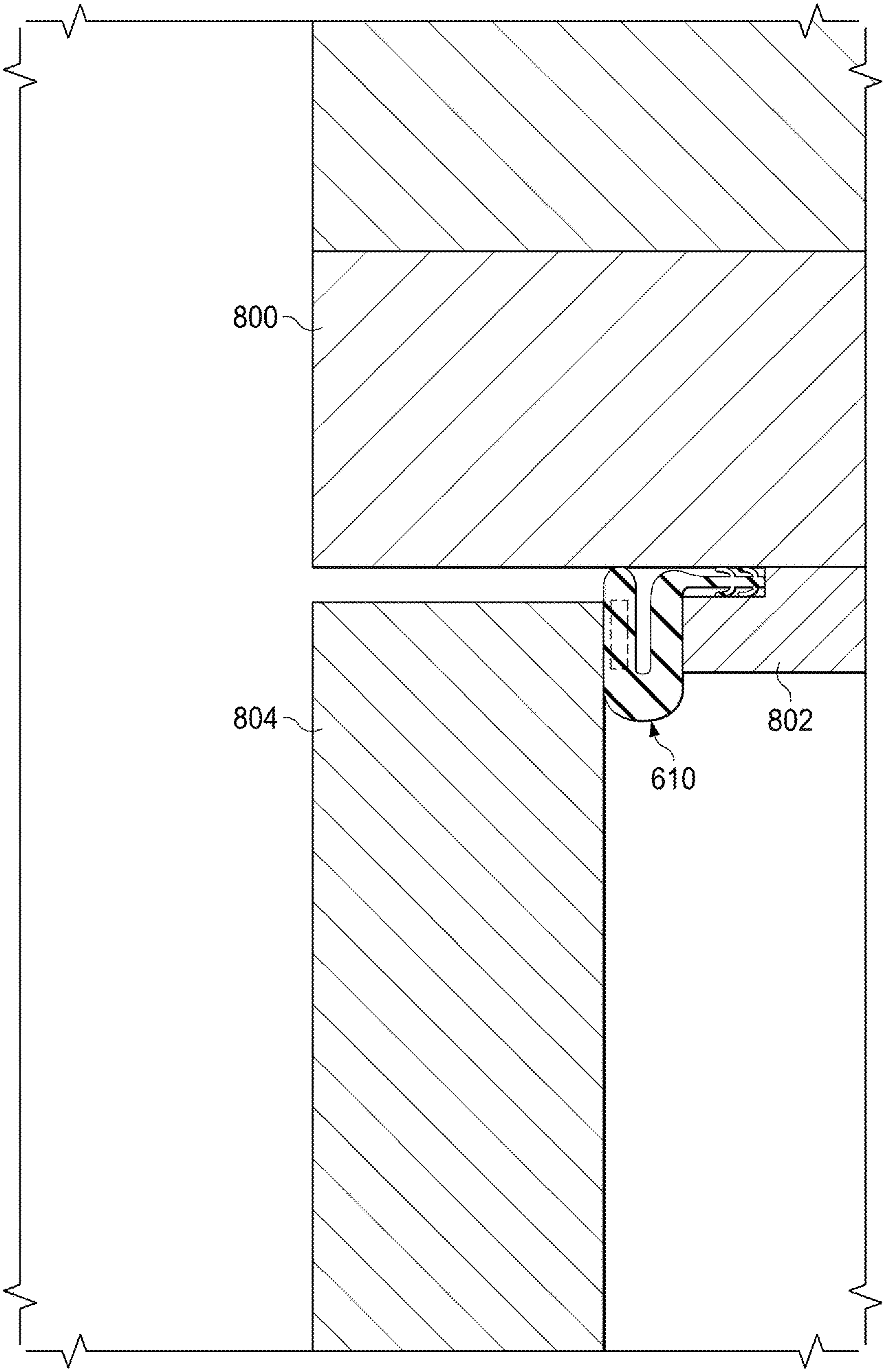
Figure 9A:
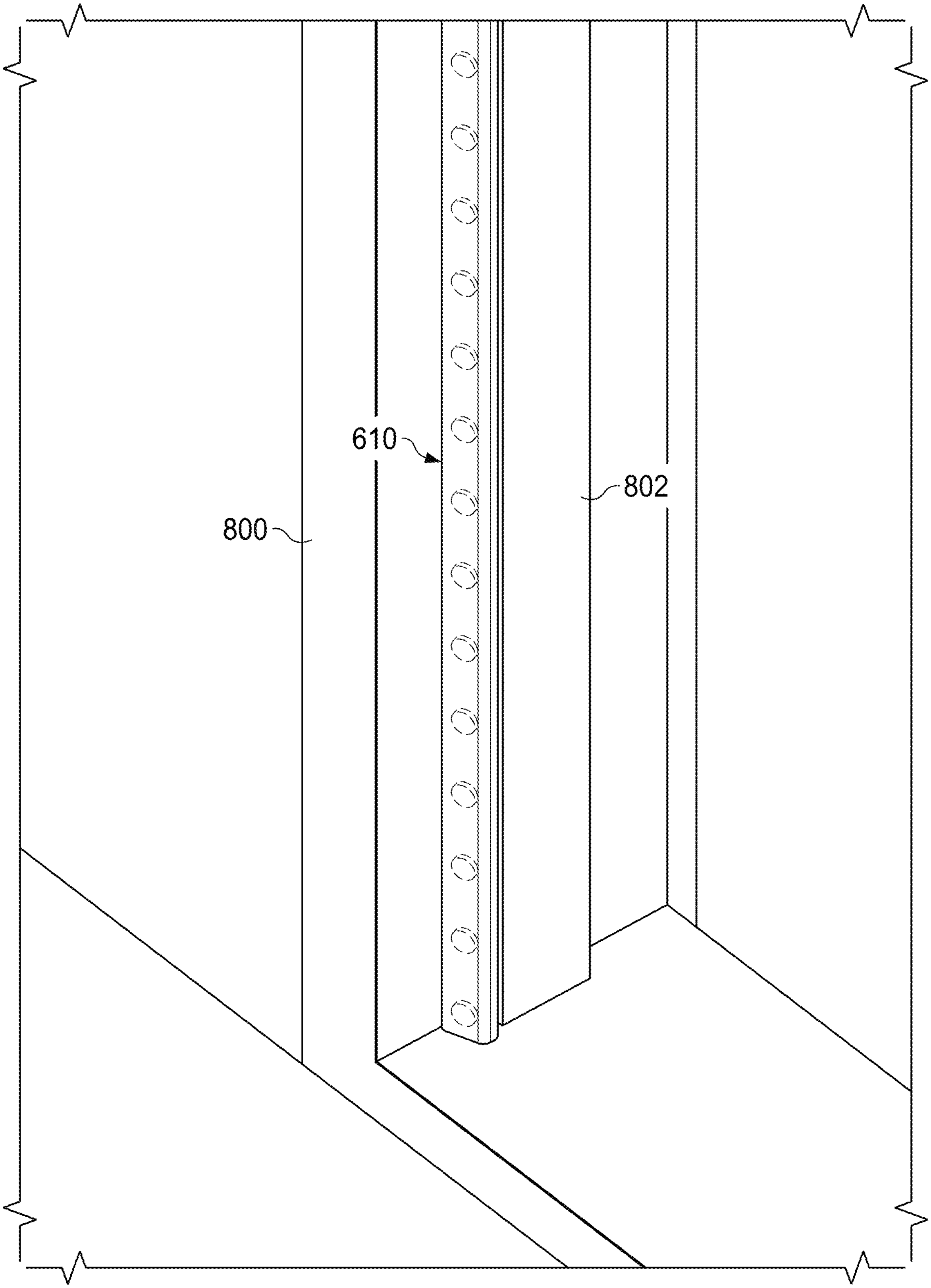
FIGS. 9A and 9B illustrate one embodiment of a section of a door frame with the flexible weather seal of FIG. 7 where the seal is uncompressed (FIG. 9A) and compressed (FIG. 9B).
Figure 9B:
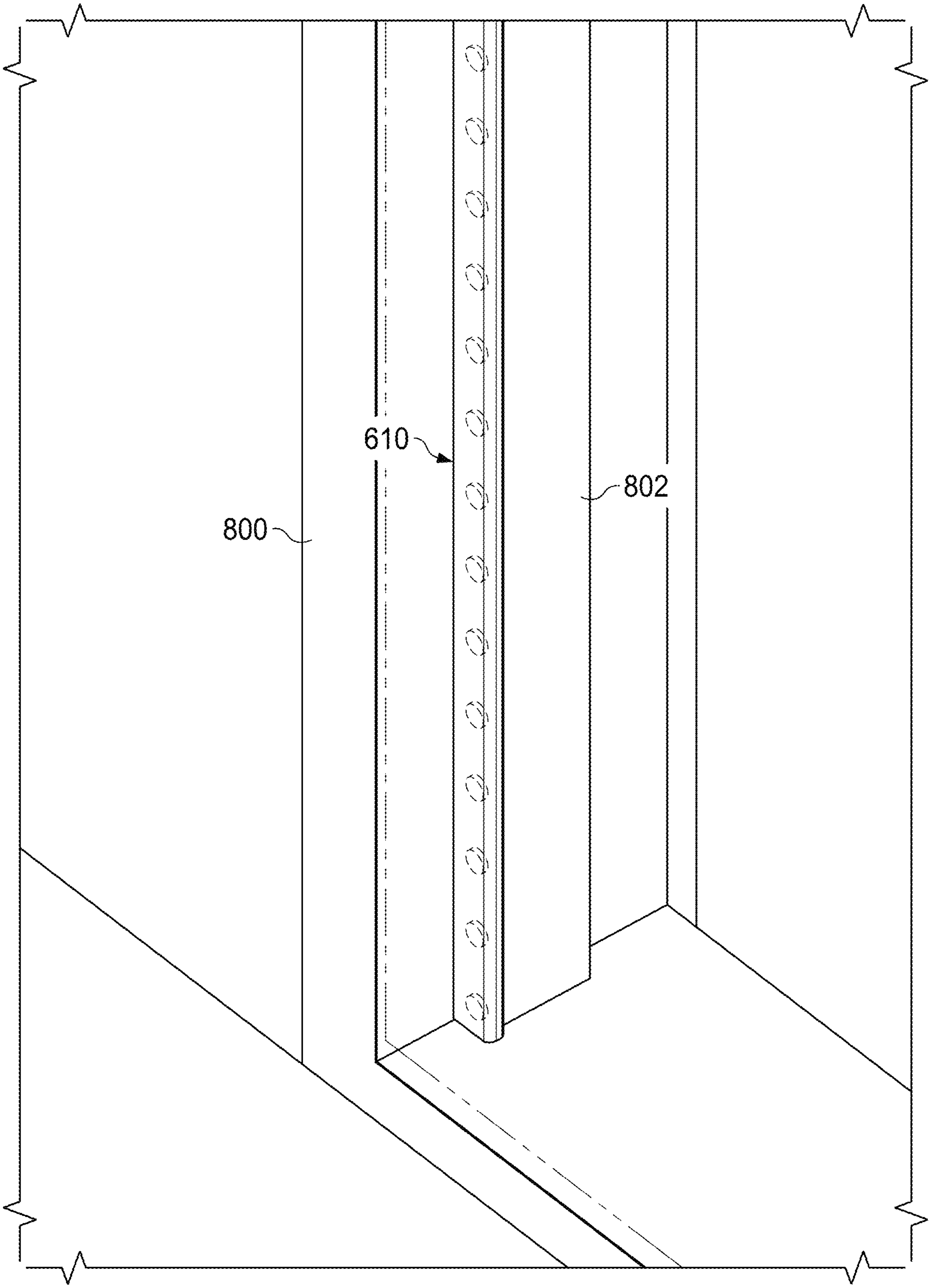

Referring to FIG. 7, one embodiment of the flexible weather seal 610 is illustrated. In the present example, the flexible weather seal 610 may include a strip 700 that may be inserted into, or formed as part of, a body 702 of the seal 610. Magnets 704 may be coupled to the strip 700, either by affixing the magnets to one or both sides of the strip, inserting the magnets into the strip, and/or using other types of attachments. In some embodiments, the strip 700 may not be used, and the magnets 704 may be coupled directly to, or inserted directly into, the body 702. Although the magnets 704 are shown as circular, it is understood that they may be any suitable size and/or shape, and may or may not be uniform in size and/or shape. Is it understood that the flexible weather strip 610 may be used without magnets.

The magnets 704 may be inserted into, or embedded within, the strip 700 at a predetermined distance "A". For example, in one embodiment, the linear center to center distance "A" between circular magnets 704 may be in the range of fifty millimeters to two hundred millimeters and, in specific instances, the linear distance A may be approximately one hundred millimeters. In certain embodiments, the overall length of the flexible weather seal 610 may be approximately 6.4 meters. In yet other embodiments, the overall width of the flexible weather stripping 610 may be approximately fifteen millimeters.

In some embodiments, the circular magnets 704 may have a diameter of between five and twenty millimeters. Specifically, in some embodiments, the diameter of the circular magnets 704 may be approximately ten millimeters in diameter and have a thickness of approximately two millimeters. In some embodiments, the magnets 704 may be zinc coated. In certain embodiments, the magnets 704 are directly embedded into the flexible weather stripping 610.

In embodiments where the magnets 704 are individual magnets and appropriately sized, or the magnetic system is formed using flexible magnet strips or rods, the flexible weather seal 610 may be bent and/or shaped around non-rectangular shaped doors and door jambs, thereby providing advantages with respect to doors having non-rectangular shapes. For example, conventional door systems often use different sizes and shapes of weather stripping, such as one shape that goes around the actual jamb, one shape that runs from the bottom of the door, and one shape that runs between the two doors. In contrast, the flexible weather seal 610 of the present disclosure may use the same type and shape of weather seal, whether with or without magnets, in all locations for simplicity and manufacturing ease.

The flexible door seal 610 may further include a "V" shape that enables the seal to collapse onto itself when compressed, thereby providing a tight weather seal. The flexible door seal 610 may also include a protrusion 706 that may include one or more ribs 708 designed to fit into or otherwise engage a cavity or other receiver, such as the cavity 608 of FIGS. 6A-6C, and to retain the protrusion 706 within the cavity.

Referring to FIGS. 8A-9B, in certain embodiments, the flexible weather strip 610 may be sized and shaped to be positioned inside of, or configured to couple to or otherwise abut, a door jamb 800 (e.g., part of the door frame 402 of FIGS. 4A-4D). For example, the door jamb 800 may include a lip 802 against which a door 804 (e.g., one of the doors 400*a* or 400*b*) is to rest when fully closed. When the door 804 is open (FIGS. 8A and 9A), the flexible weather seal 610 may be uncompressed, as shown by the open "V" shape. When the door 804 is closed (FIGS. 8B and 9B), the flexible weather seal 610 may be compressed to block any gap between the door and the lip 802.

In embodiments where the door 804 is made from a ferrous metal (or has a ferrous metal frame) and the flexible weather seal 610 includes magnets 704, a tight seal may be created because the magnets within the flexible weather seal 610 will be attracted to the ferrous metal of the door 804. It is understood that the strength of the magnets may be selected to provide a suitably tight seal while allowing the door or glass panel frame to be relatively easily opened.

Referring to FIGS. 10A-10E, one embodiment of the doors 400*a* and 400*b* of FIGS. 4A-4D is illustrated. The doors 400*a* and 400*b* in the present example provide a double door system that demonstrates various aspects of the present disclosure, including the use of a double astragal, flexible weather seals, removable screens, removable decorative panels, and openable glass panels. It is understood that the double door system may be implemented with some or all of these features, and various features may be omitted if desired.

Figure 10A:
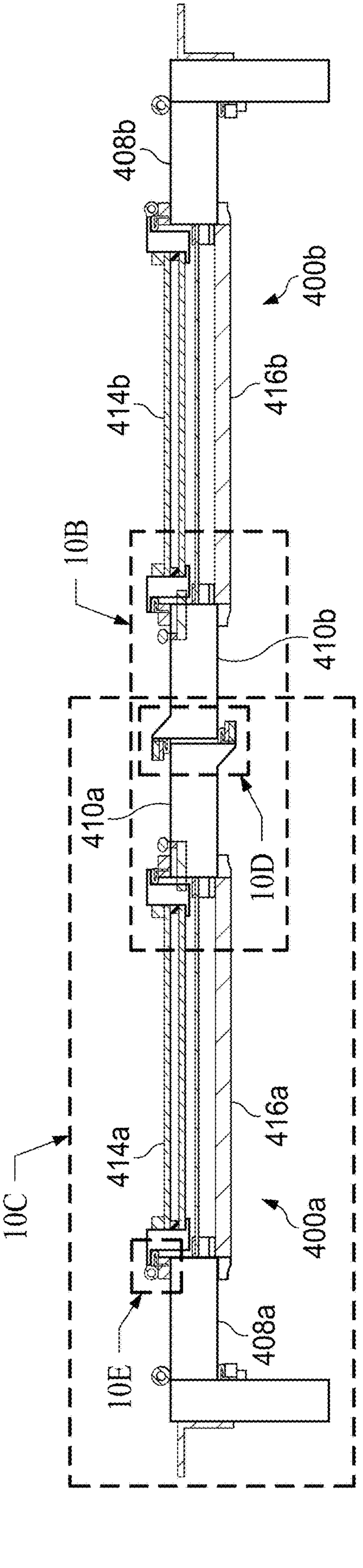
FIG. 10A illustrates one embodiment of a horizontal section view of the improved door system of FIGS. 4A-4D with the doors and glass panels closed.
Figure 10B:
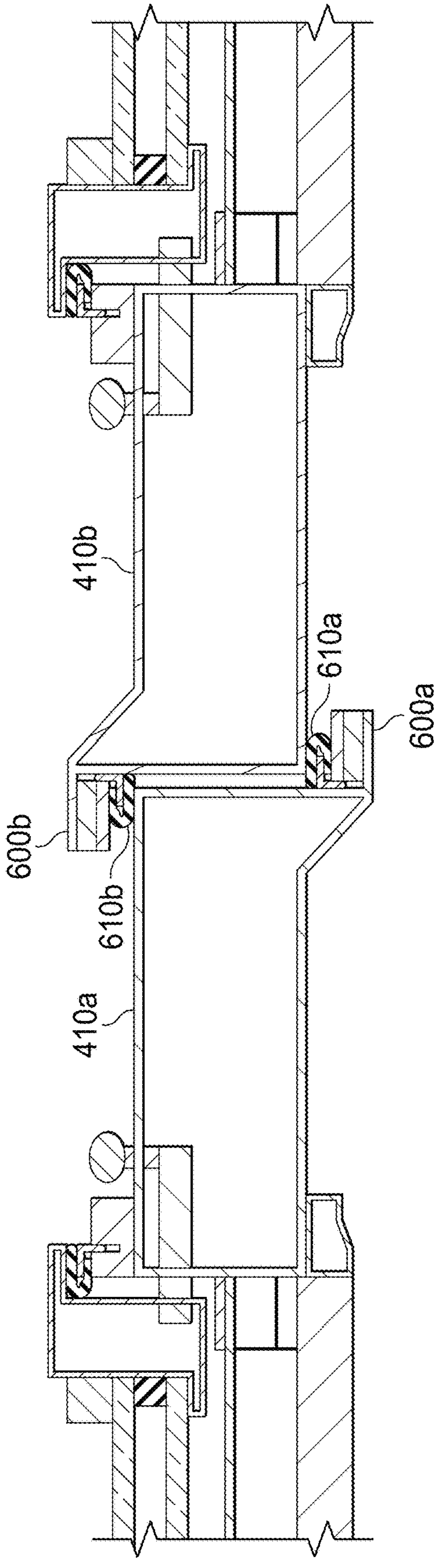
FIG. 10B illustrates one embodiment of a detailed view of a portion of FIG. 10A showing, among other details, the use of double astragals and flexible weather seals.
Figure 10C:
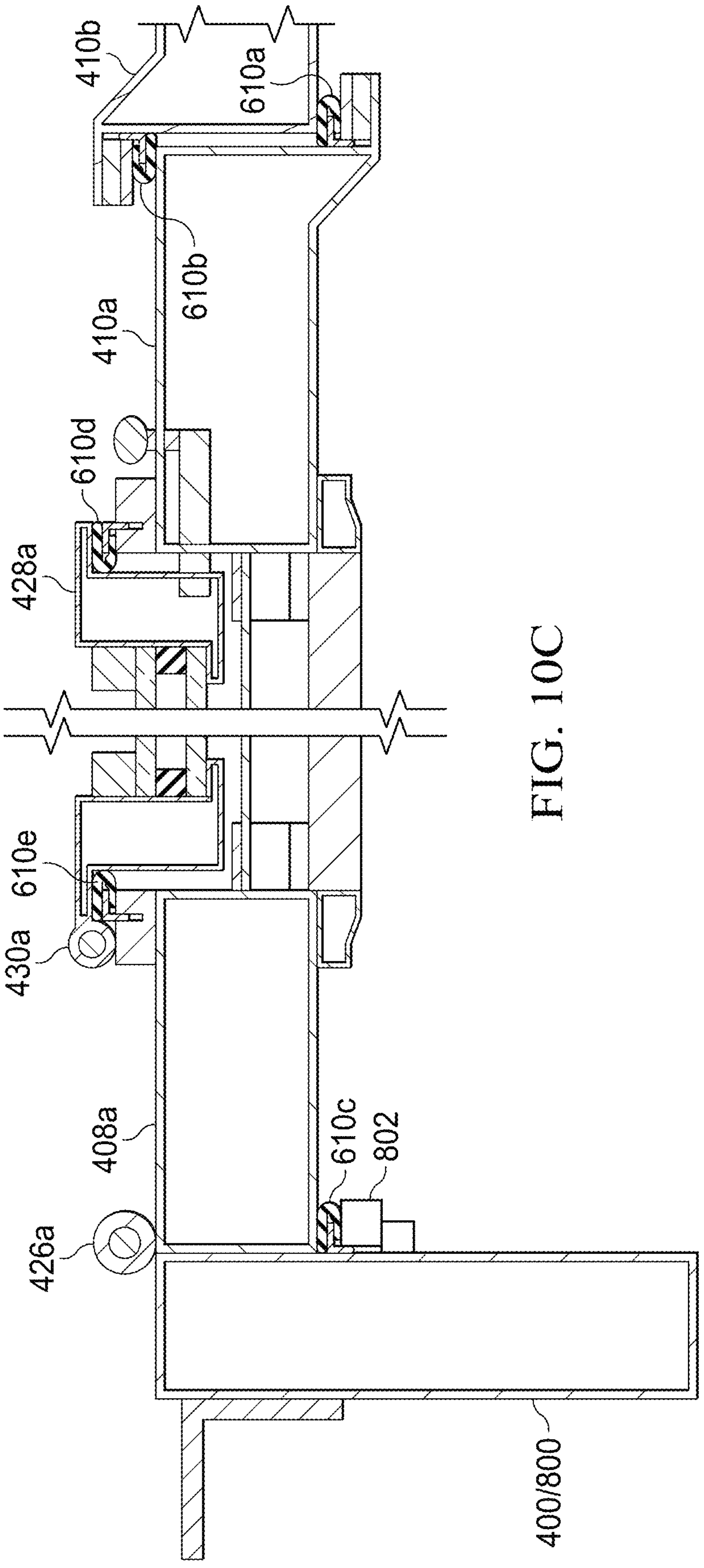
FIG. 10C illustrates one embodiment of a detailed view of a portion of FIG. 10A showing, among other details, the use of flexible weather seals.
Figure 10D:
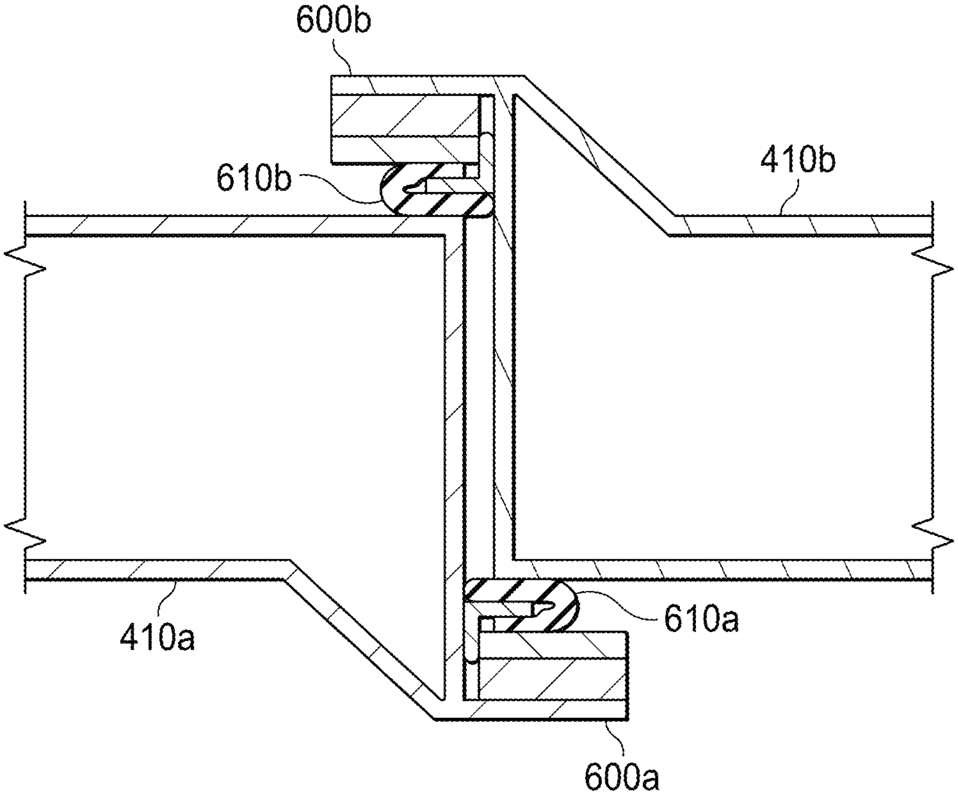
FIG. 10D illustrates one embodiment of a detailed view of a portion of FIGS. 10A and 10B showing, among other details, the use of double astragals and flexible weather seals.

Referring to specifically to FIGS. 10B and 10D, a view of one embodiment of double astragals is illustrated. The use of two astragals enables one to be positioned on the interior side of one door and the other to be positioned on the exterior side of the adjacent door.

The astragal 600*a* is similar or identical to that of FIG. 6B, with latch stile 410*a* providing support for the astragal 600*a*, and the flexible weather seal 610*a* providing a strip to seal any resulting gap between the astragal 600*a* and the door 400*b*. In addition, the door 400*b* includes an astragal 600*b* with a flexible weather seal 610*b*. As shown, as the astragal 600*b* seals any gap between the doors on the interior side and the astragal 600*a* seals the gap from the exterior side. It is understood that the astragals 600*a* and 600*b* may be reversed with a similar result.

Figure 10E:
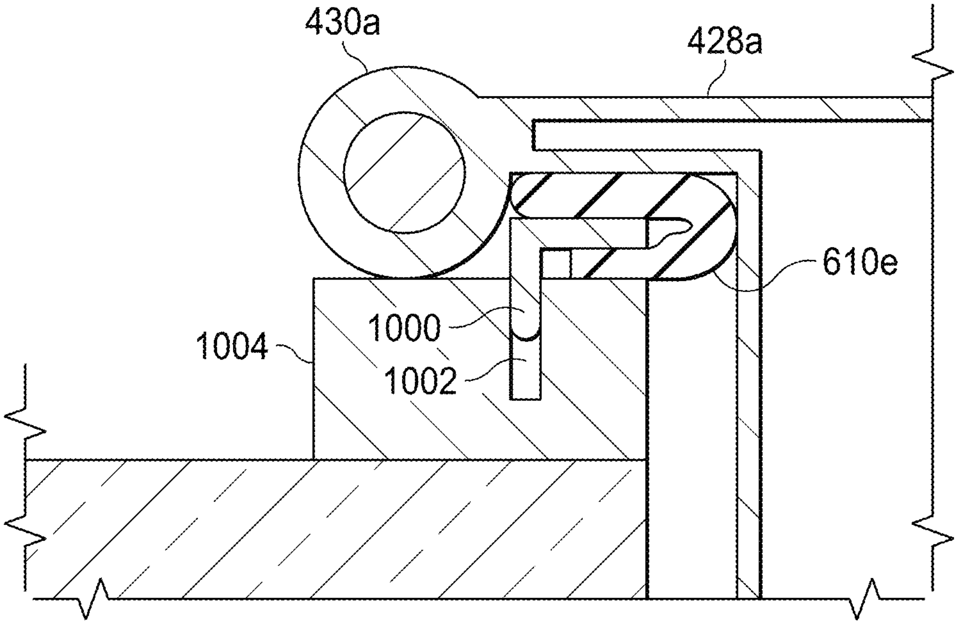
FIG. 10E illustrates one embodiment of a detailed view of a portion of FIGS. 10A and 10C showing, among other details, the use of a flexible weather seal with a glass panel frame.

Referring specifically to FIGS. 10C and 10E, a partial view of the doors 400*a* and 400*b* of FIG. 10A illustrates one embodiment of the use of multiple flexible weather seals 610*a*-610*e*. Is it understood that more or fewer flexible weather seals may be used, and/or other types of weather seals may be used in addition to, or as alternatives to, those shown.

In addition to the flexible weather seals 610*a* and 610 described with respect to the astragals 600*a* and 600*b* in FIG. 10B, a flexible weather seal 610*c* may be positioned to cover a gap between the door 400*a* and the frame 402/door jamb 800. As described with respect to FIGS. 8A-9B, the flexible weather seal 610*c* may be compressed between the door 400*a* and a lip 802 of the frame 402/door jamb 800.

One or more flexible weather seals 610*d* and 610*e* may be used to seal a gap between the glass panel frame 428*a* and the remainder of the door 400*a*. Although referenced as two flexible weather seals 610*d* and 610*e*, it is understood that they may be a single seal. In some embodiments, as shown in FIG. 10E, the flexible weather seal 610*e* may be retained using a member 1000 that has one arm that fits into the "V" of the seal. Another arm of the member 1000 may fit into a cavity 1002 in a support 1004, that may be part of, or coupled to, the frame 428*a* or the hinge stile 408*a*.

Figure 11A:
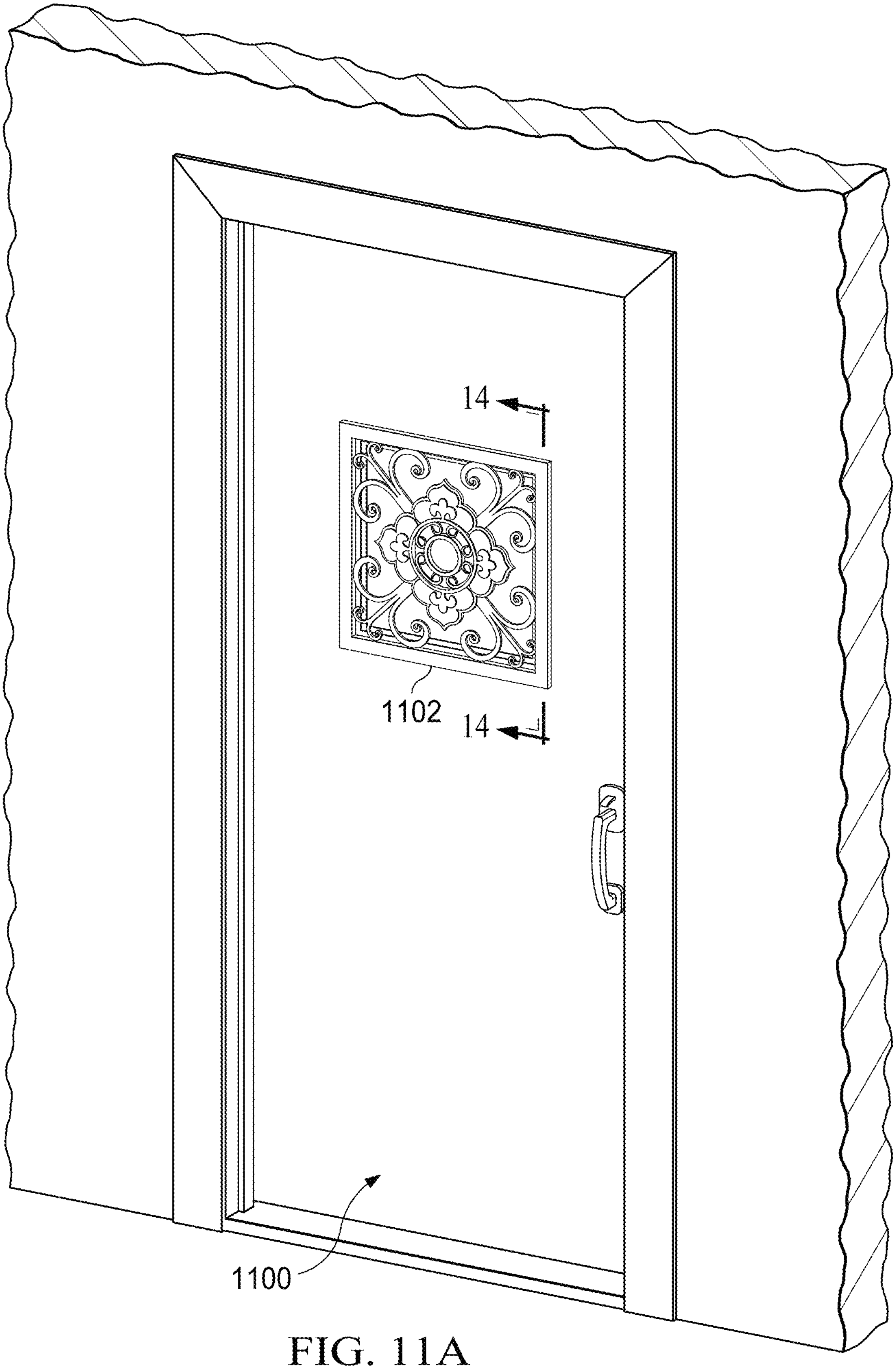
FIGS. 11A and 11B illustrate embodiments of a door with a decorative panel.
Figure 11B:
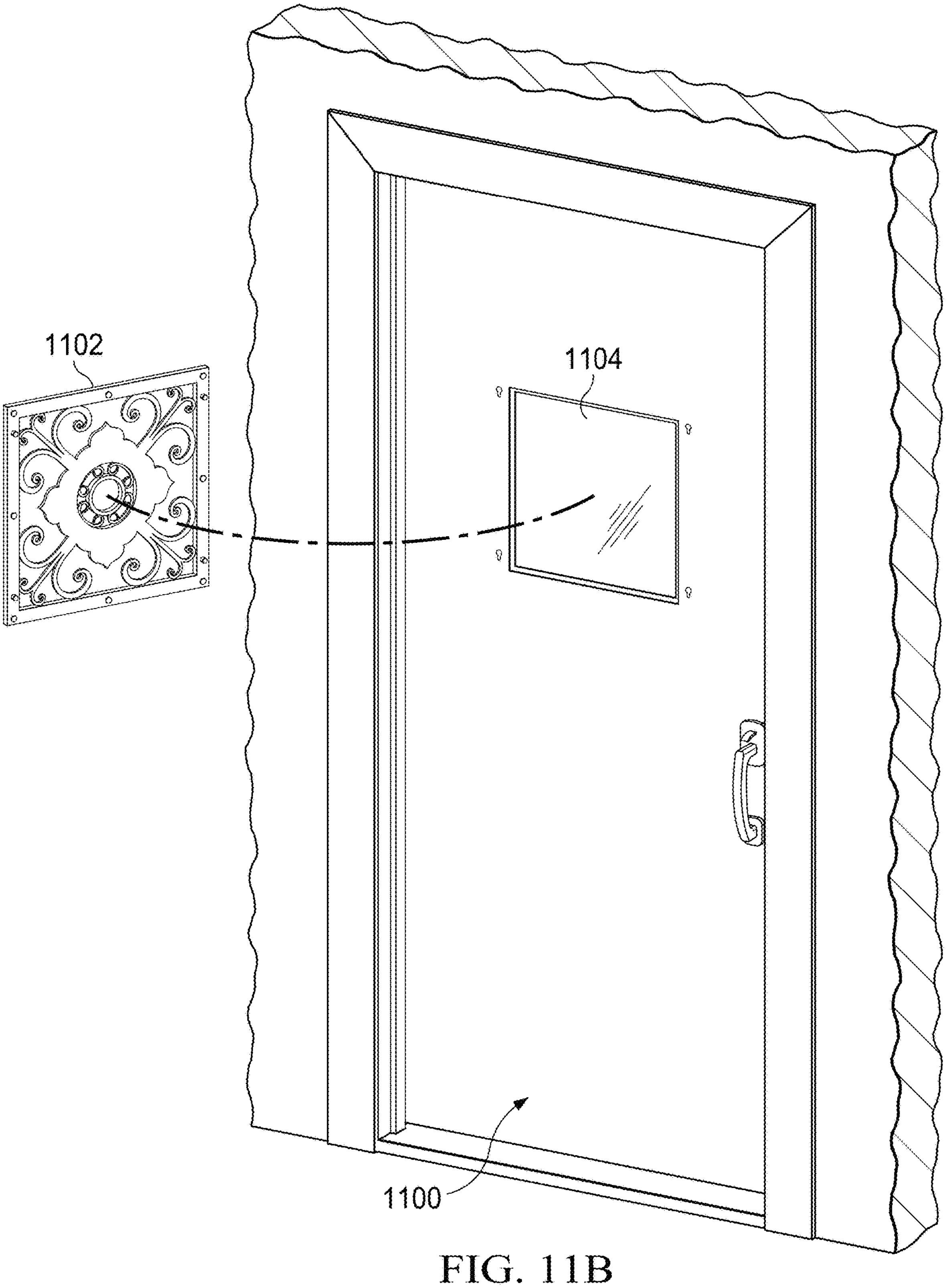
Figure 12A:
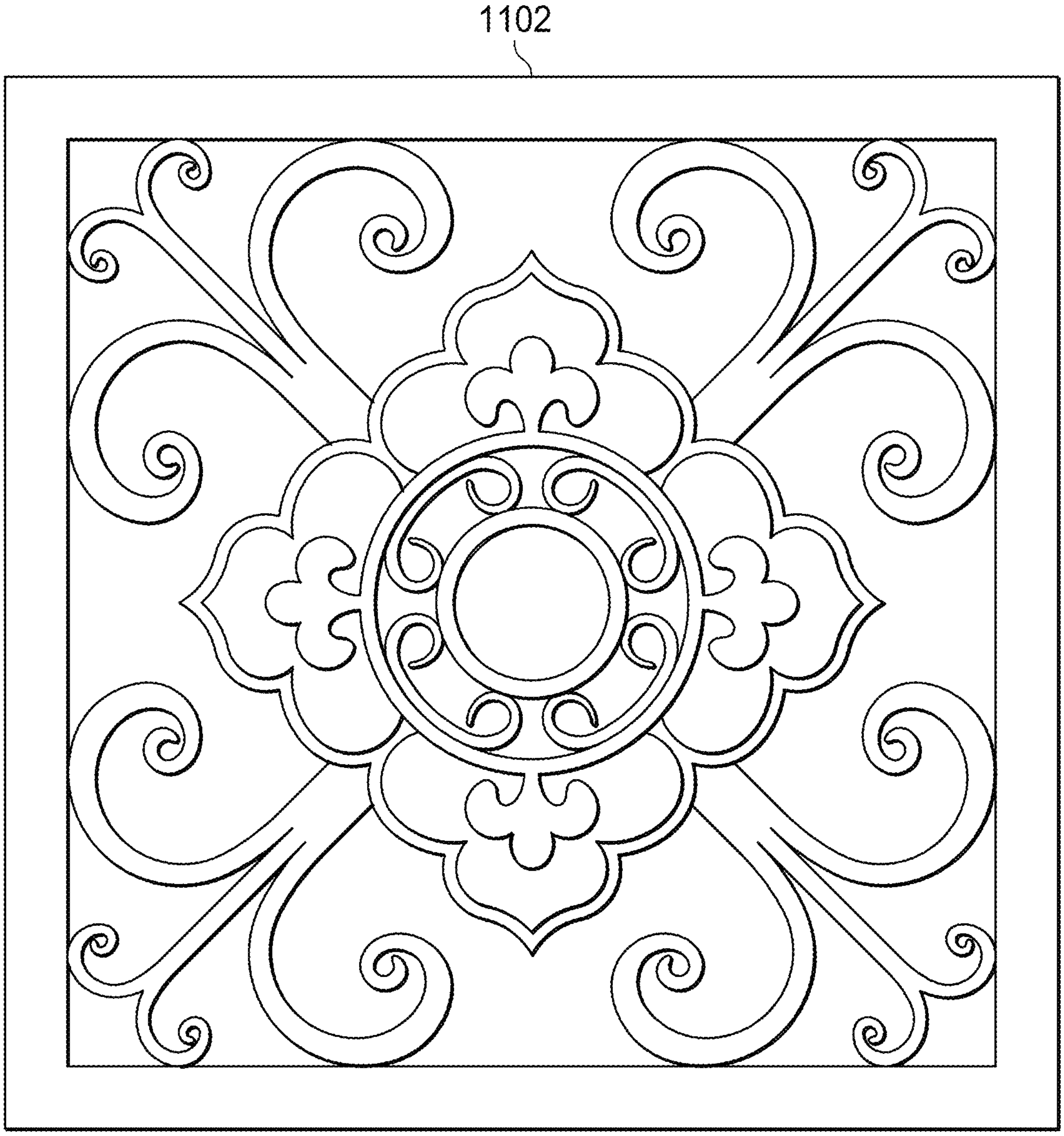
FIGS. 12A and 12B illustrate embodiments of the decorative panel of FIGS. 11A and 11B.
Figure 12B:
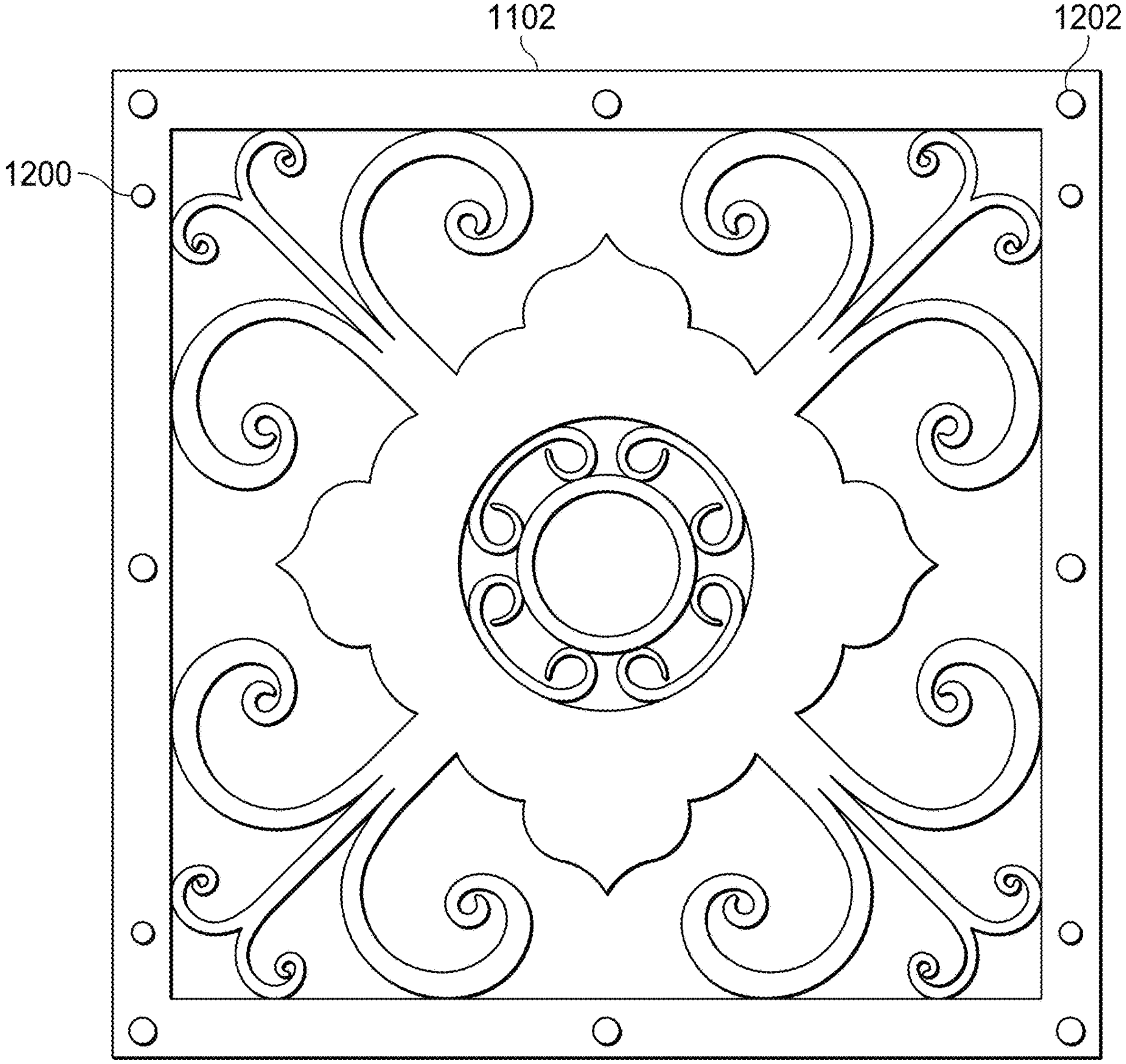

Referring to FIGS. 11A and 11B, one embodiment of a door 1100 with a decorative panel 1102 is illustrated. FIG. 11A illustrates the door 1100 with the decorative panel 1102 in place, and FIG. 11B illustrates the door 1100 with the decorative panel 1102 removed from the door. A glass panel 1104 may be positioned behind the decorative panel 1102.

Figure 13:
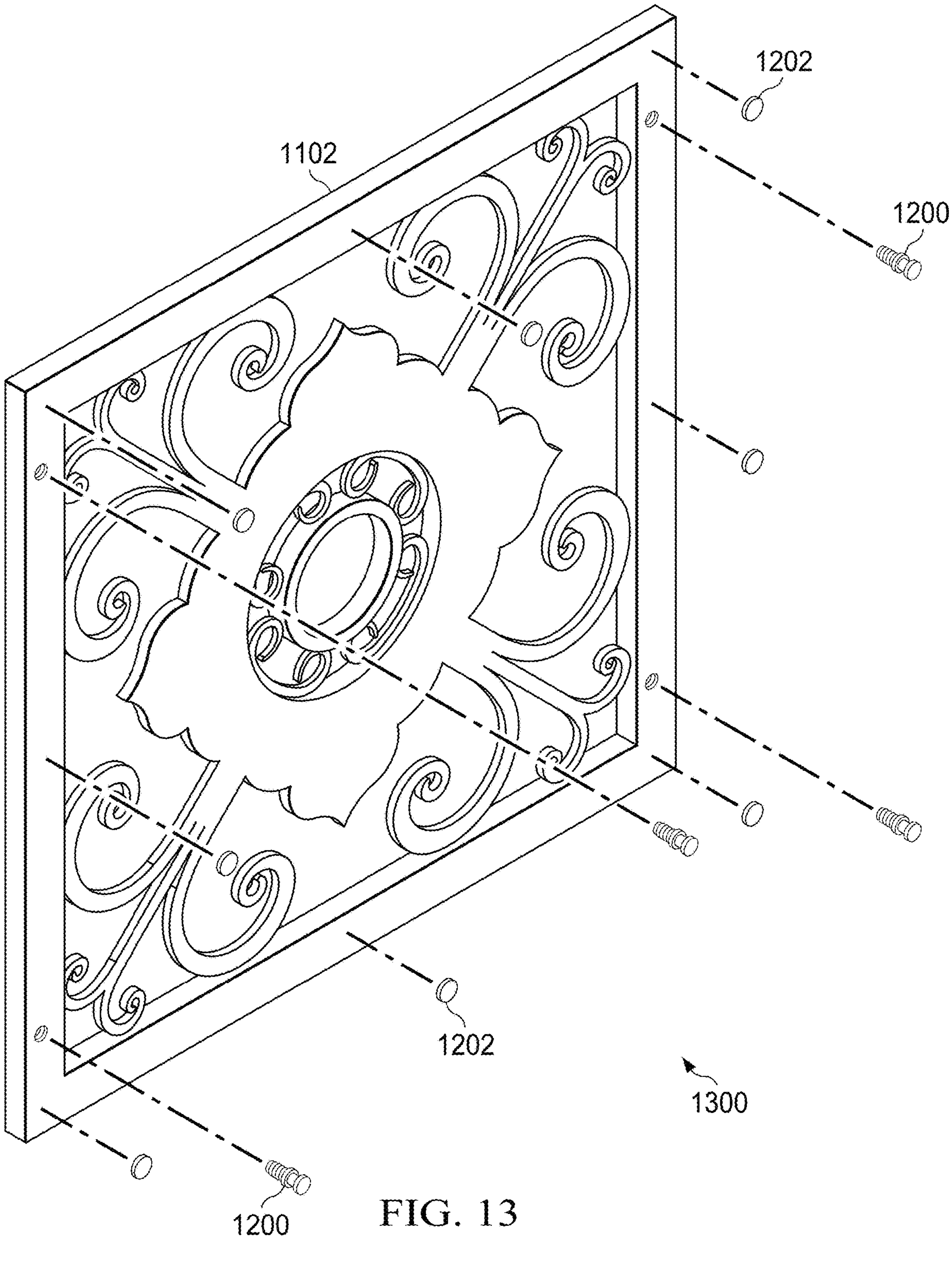
FIG. 13 illustrates an embodiment of an attachment system that may be used to couple the decorative panel of FIGS. 11A and 11B to the door.
Figure 14:
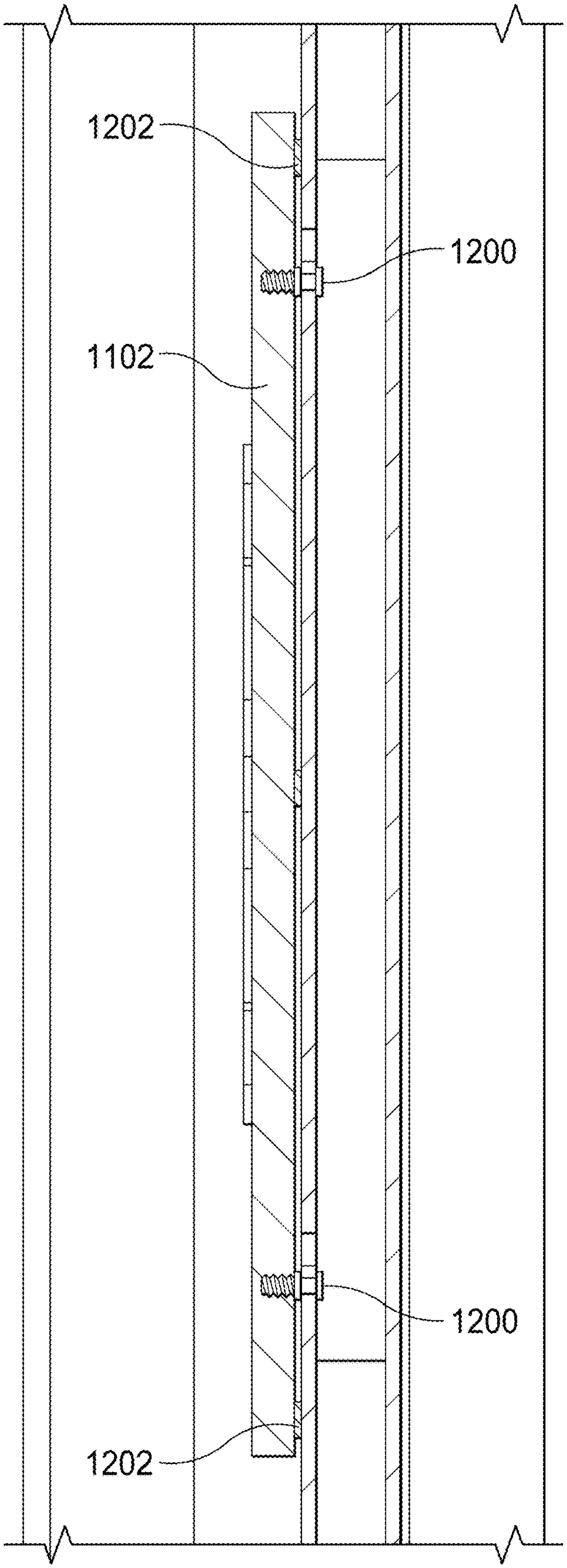
FIG. 14 illustrates an embodiment of a section view of the decorative panel of FIGS. 11A and 11B coupled to the door.

Referring to FIGS. 12A-14, one embodiment illustrates a front view (FIG. 12A) and back view (FIG. 12B) of the decorative panel 1102 with an example of an attachment system 1300 (FIG. 13). The decorative panel 1102 may be coupled to the door 1100 using fasteners 1200 (e.g., flat head studs) captured by slots formed in the door. For example, the attachment system 1300 may include a plurality of flat headed studs 1200 that are designed to mate with matching slots formed within the door 1100. In some embodiments, there may be a plurality of spacers 1202 that are used to reduce movement and vibration of the decorative panel 1102.

Figure 15:
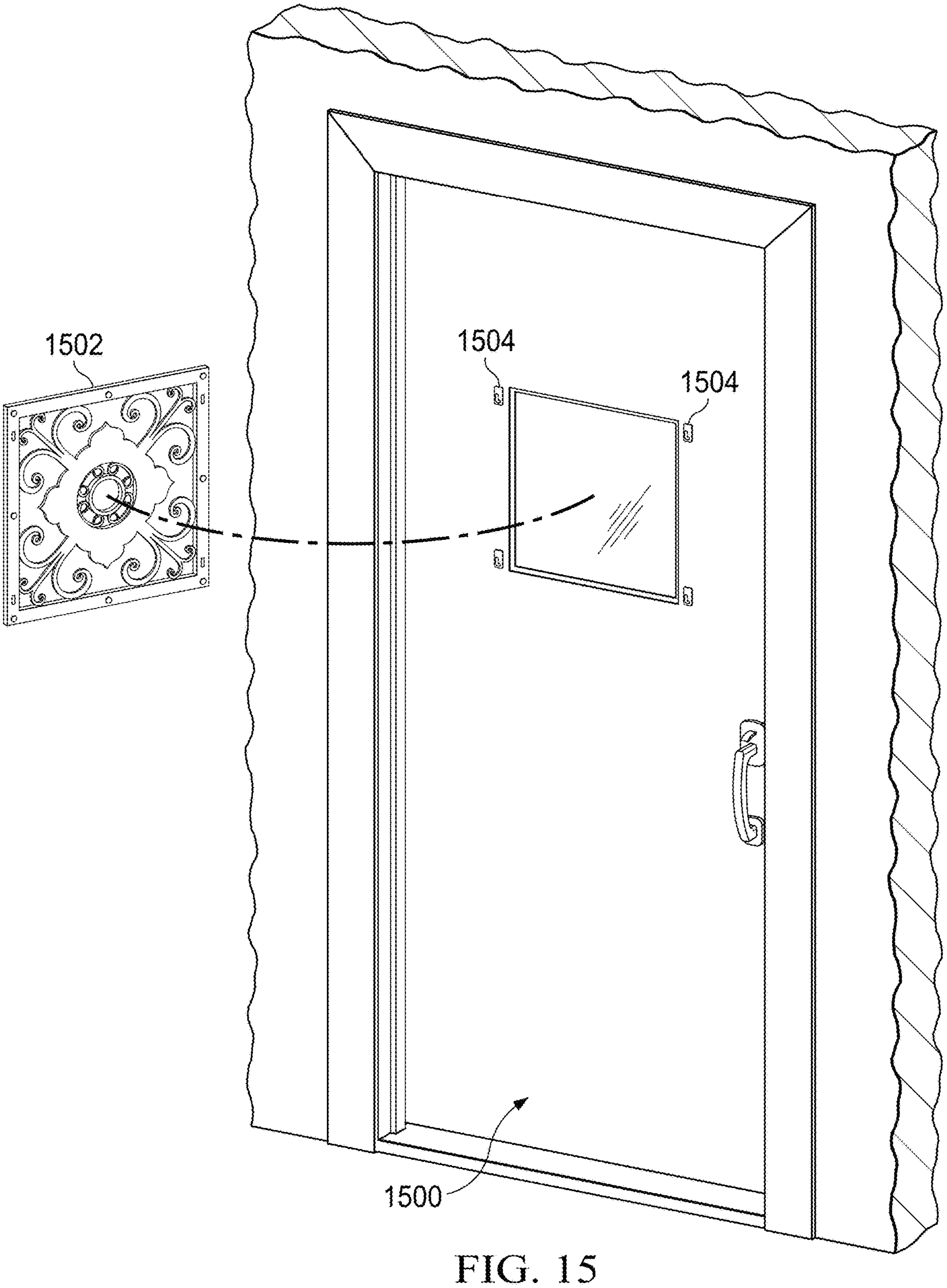
FIG. 15 illustrates another embodiment of a door with a decorative panel.

Referring to FIG. 15, a perspective view illustrates an alternative embodiment of a door 1500 showing an alternative embodiment of the decorative panel 1502 removed from the door. Hooks 1504 may be used to attach the decorative panel 1502 to the door 1500.

Figure 16:
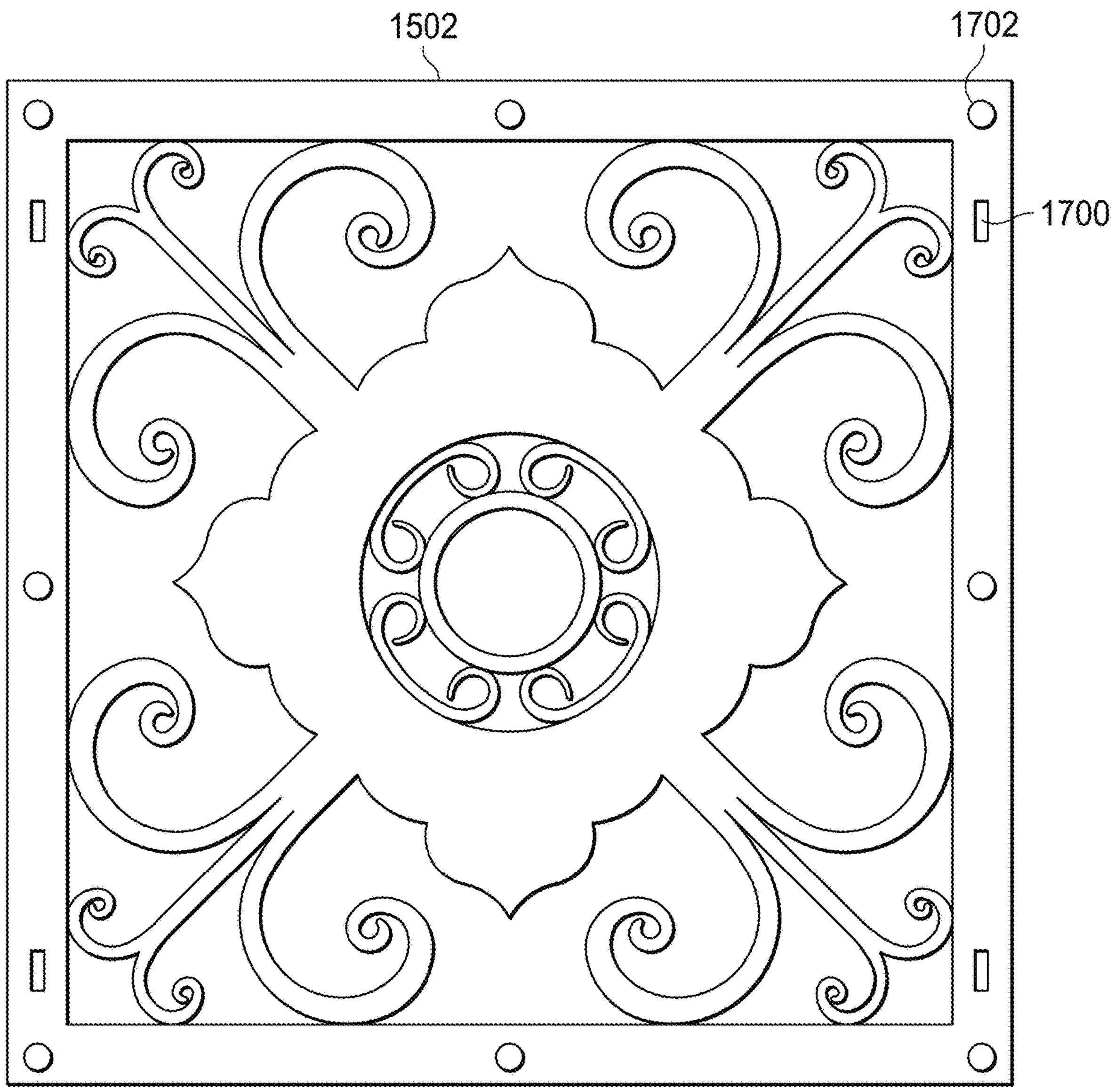
FIG. 16 illustrates an embodiment of the decorative panel of FIG. 15.
Figure 17:
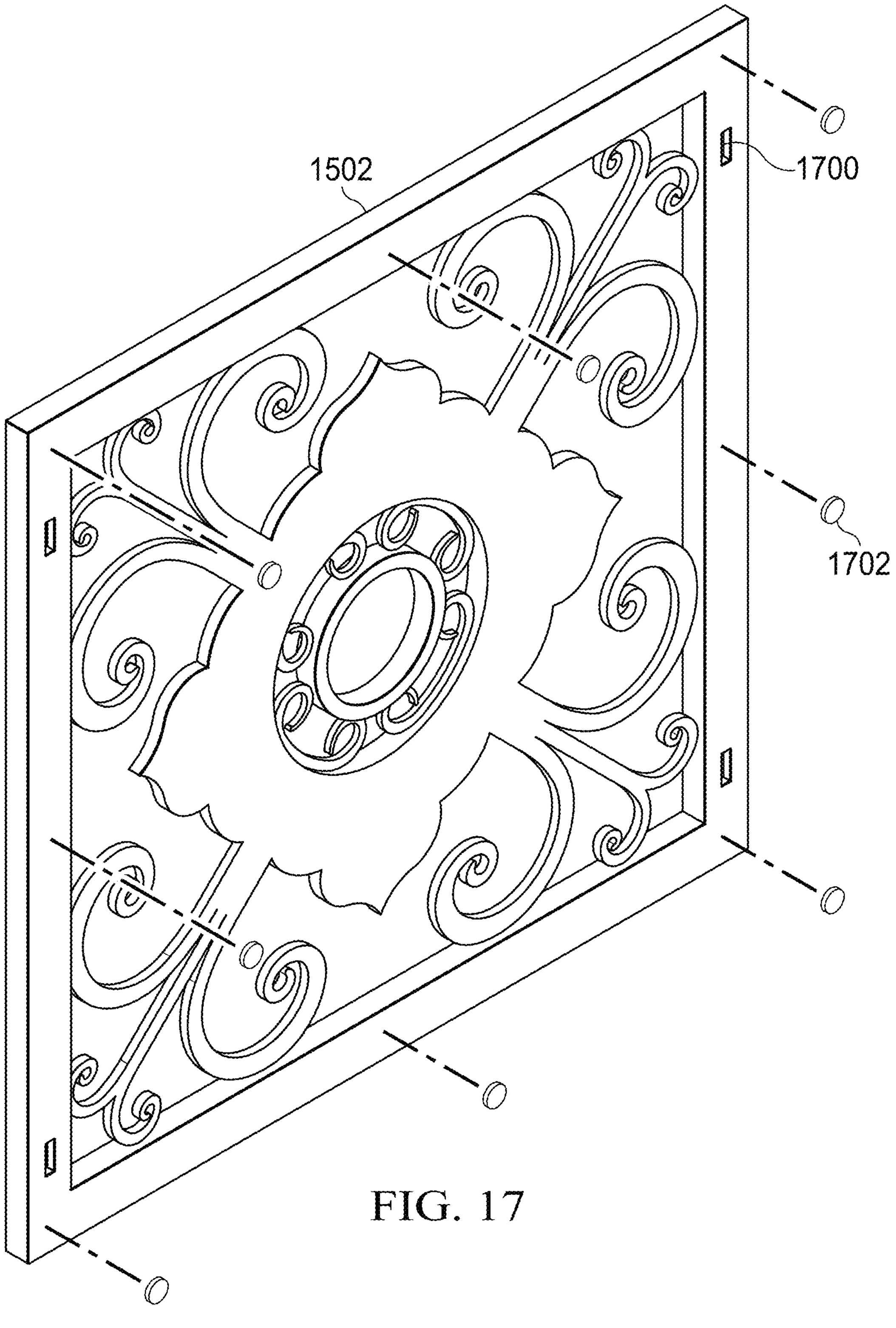
FIG. 17 illustrates an embodiment of an attachment system that may be used to couple the decorative panel of FIG. 15 to the door.
Figure 18:
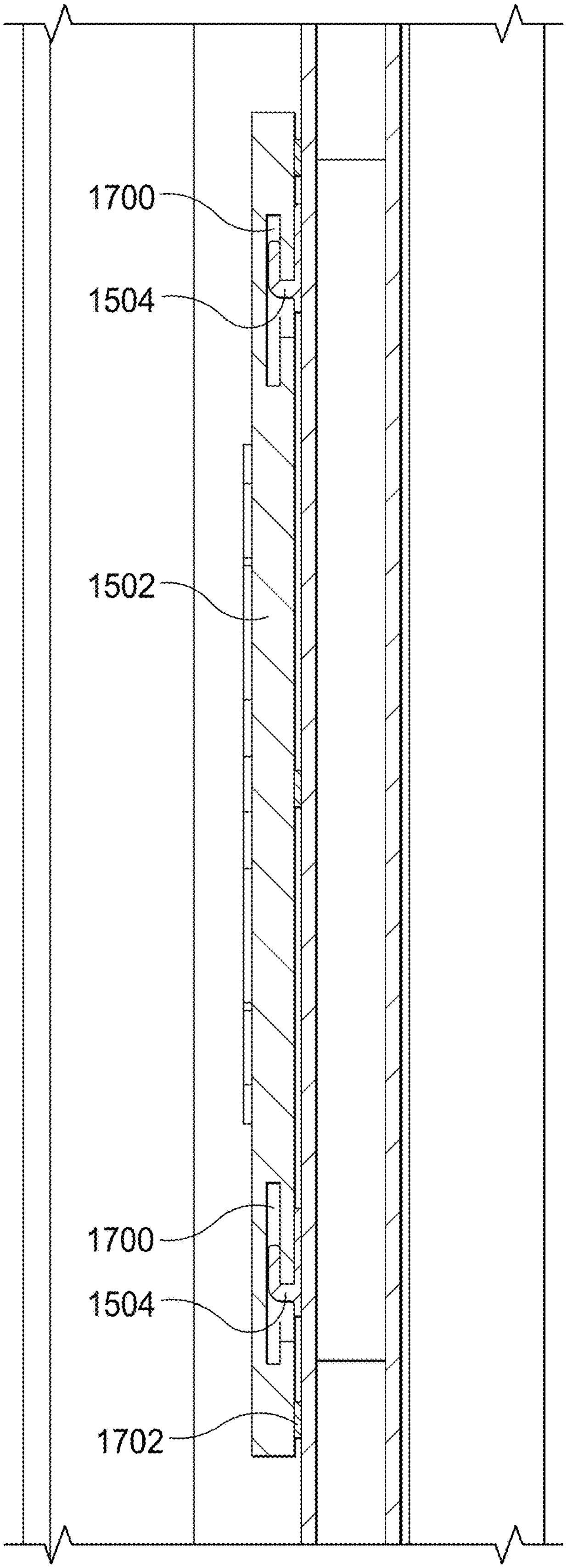
FIG. 18 illustrates an embodiment of a section view of the decorative panel of FIG. 15 coupled to the door.

Referring to FIGS. 16-18, one embodiment illustrates a rear view (FIG. 16) of the alternative embodiment of the decorative panel 1502. In the illustrative embodiment, the back of the decorative panel 1502 has vertical slots 1700 that are designed to capture corresponding hooks 1504 (FIG. 15) provided in the exterior face of the door 1500. In some embodiments, there may be a plurality of spacers 1702 that are used to reduce movement and vibration of the decorative panel 1502.

Figure 19:
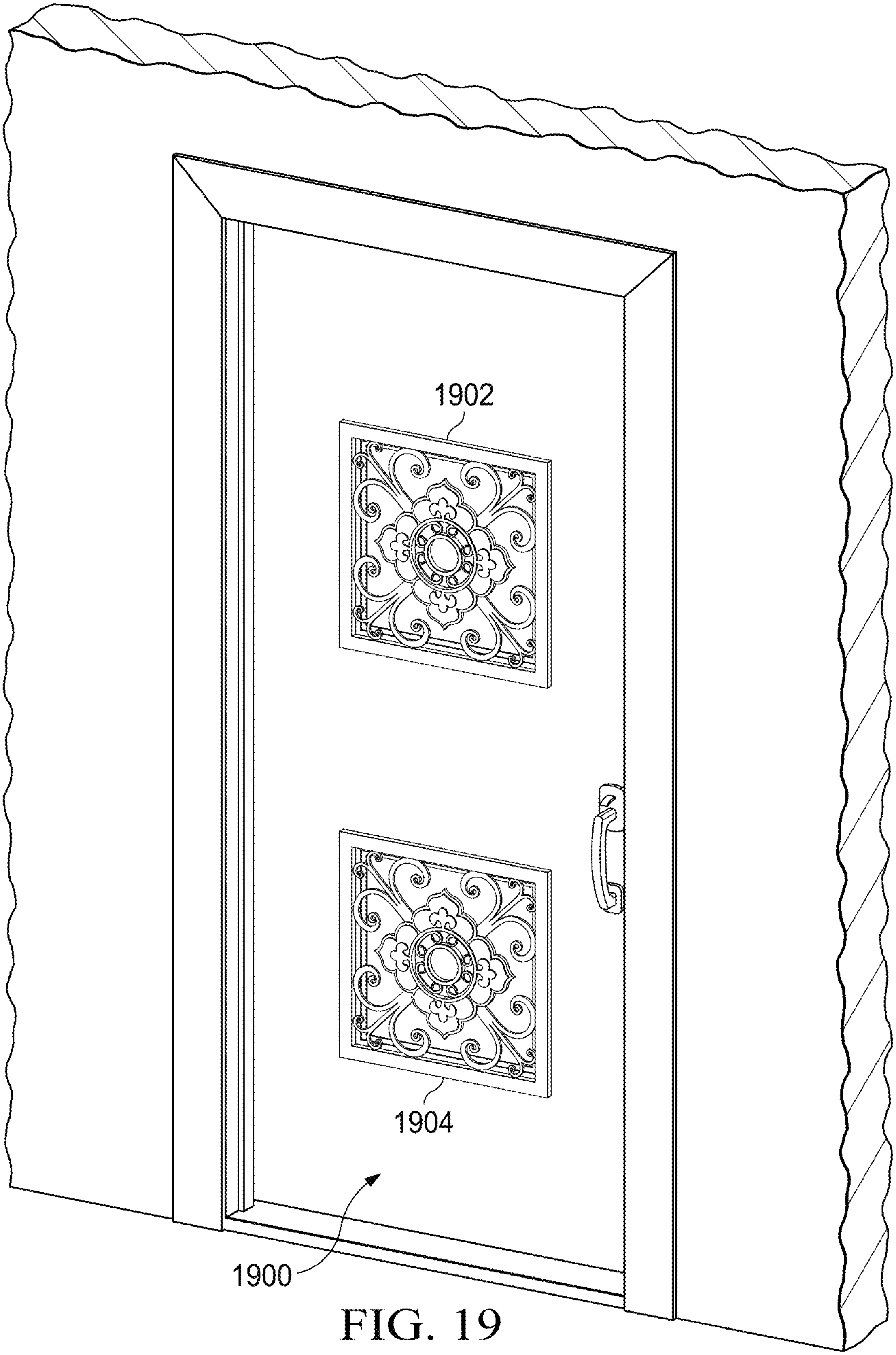
FIG. 19 illustrates an embodiment of a door with multiple decorative panels.

FIG. 19 is a perspective view illustrating an alternative embodiment of a door 1900 with two decorative panels 1902 and 1904 attached to the door. It is understood that in this or any other embodiment described herein, there may be one or more panels, such panels may be of various sizes and shapes, and/or such panels may be matching or different. In some embodiments, one or more of the panels may have different designs to match seasons or holidays.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above-described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims.

What is claimed is:

1. A double door system comprising:

a first door having a first stile, the first stile including, a first generally rectangular cross-section shape;

a first protrusion extending from the first generally rectangular cross-section shape and positioned adjacent to a first mating edge of the first generally rectangular cross-section shape;

a first astragal extending from the first protrusion beyond the first mating edge in a generally perpendicular direction relative to the first mating edge;

a second door having a second stile, the second stile including, a second generally rectangular cross-section shape;

a second protrusion extending from the second generally rectangular cross-section shape in an opposing direction from the first protrusion and positioned adjacent to a second mating edge of the second generally rectangular cross-section shape;

a second astragal extending from the second protrusion beyond the second mating edge in a generally perpendicular direction relative to the second mating edge;

wherein the first mating edge of the first stile is positioned adjacent to the second mating edge of the second stile when the first door and second door are in a closed configuration;

wherein a first strip of magnetic weatherstripping is coupled to the first astragal and positioned between the first astragal and the second stile; and a second strip of magnetic weatherstripping coupled to the second astragal and positioned between the second astragal and the first stile, wherein the first and second strips of magnetic weather stripping are formed by coupling a plurality of magnets spaced at regular intervals to a flexible weather seal and the flexible weather seal has a "V" shaped cross-section and a protruding coupling member positioned within a first or second receiving slot.

2. The system of claim 1, wherein the first astragal is formed by extending a first sheet of metal forming a portion of the first protrusion and an interior side of the first stile.

3. The system of claim 2, wherein the second astragal is formed by extending a second sheet of metal forming a portion of the second protrusion and an exterior side of the second stile.

4. The system of claim 1, wherein the first protrusion is generally triangular in cross-section and has a side that is an extension of the first mating edge.

5. The system of claim 4, further comprising a first linear spacer coupled to the first astragal such that a first receiving slot is formed between the first linear spacer and the first mating edge.

6. The system of claim 1, wherein the first protrusion is generally rectangular in cross-section and has a side that is an extension of the first mating edge.

7. The system of claim 1, wherein the second protrusion is generally triangular in cross-section and has a side that is an extension of the second mating edge.

8. The system of claim 7, further comprising a second linear spacer coupled to the second astragal such that a second receiving slot is formed between the second linear spacer and the second mating edge.

9. The system of claim 1, wherein the second protrusion is generally rectangular in cross-section and has a side that is an extension of the second mating edge.

10. The system of claim 1, further comprising a first decorative panel removably coupled to the first door and a second decorative panel removably coupled to the second door.

11. The system of claim 1, wherein the first door includes a first hinged window and the second door includes a second hinged window.

12. The system of claim 1, wherein the first door includes a first screen and the second door includes a second screen.

* * * * *